United States Patent
Pasumarthi et al.

(10) Patent No.: US 9,037,579 B2
(45) Date of Patent: May 19, 2015

(54) GENERATING DYNAMIC HIERARCHICAL FACETS FROM BUSINESS INTELLIGENCE ARTIFACTS

(75) Inventors: Suresh Pasumarthi, Bangalore (IN); Ganesh Vaitheeswaran, Bangalore (IN); Tanu Gupta, Bangalore (IN); Som Ranjan Satpathy, Bangalore (IN)

(73) Assignee: BUSINESS OBJECTS SOFTWARE LTD. (IE)

( * ) Notice: Subject to any disclaimer, the term of this patent is extended or adjusted under 35 U.S.C. 154(b) by 201 days.

(21) Appl. No.: 13/337,290

(22) Filed: Dec. 27, 2011

(65) Prior Publication Data

US 2013/0166547 A1 Jun. 27, 2013

(51) Int. Cl.
*G06F 17/30* (2006.01)
*G06Q 10/06* (2012.01)

(52) U.S. Cl.
CPC ............ *G06Q 10/06* (2013.01); *G06F 17/3028* (2013.01)

(58) Field of Classification Search
CPC ............................ G06F 17/3028; G06Q 10/06
USPC ................. 707/705, 722, 723, 728, 999.001, 707/999.002, 999.003
See application file for complete search history.

(56) References Cited

U.S. PATENT DOCUMENTS

| | | | |
|---|---|---|---|
| 5,657,437 A * | 8/1997 | Bishop et al. | 715/203 |
| 5,875,446 A * | 2/1999 | Brown et al. | 1/1 |
| 7,181,438 B1 * | 2/2007 | Szabo | 1/1 |
| 2004/0036716 A1* | 2/2004 | Jordahl | 345/713 |
| 2005/0060287 A1* | 3/2005 | Hellman et al. | 707/2 |
| 2005/0234880 A1* | 10/2005 | Zeng et al. | 707/3 |

* cited by examiner

*Primary Examiner* — Shiow-Jy Fan
(74) *Attorney, Agent, or Firm* — Horizon IP Pte. Ltd.

(57) ABSTRACT

Systems and methods for generating dynamic hierarchical facets from business intelligence artifacts are described herein. In accordance with one aspect of the present disclosure, grouping information is extracted from one or more business intelligence artifacts or a semantic layer. Facets or categories are dynamically linked based on the extracted grouping information to generate one or more hierarchical facets. The hierarchical facets may be incorporated in search results to facilitate ease of navigation.

19 Claims, 22 Drawing Sheets

202 — Name: Report1
Type: CrystalReport
ID: 1200

| Country | State | City |
|---------|-----------|-----------|
| India | Karnataka | Bangalore |
| India | Maharastra | Mumbai |
| US | Ohio | Greenville |

204 — Name: Report2
Type: CrystalReport
ID: 1400

| Country | State | City |
|---------|------------|------------|
| India | Maharastra | Pune |
| US | Ohio | Greenville |

206 — Name: Report3
Type: CrystalReport
ID: 1434

| Country | City |
|---------|---------|
| India | Bhopal |
| US | Raleigh |

Fig. 2a

Fig. 3a

| Boe.search.facethierachylink | 1@4 |
| Boe.search.facethierachylink | 1@5 |
| Boe.search.facethierachylink | 1@6 |
| Boe.search.facethierachylink | 2@10 |
| Boe.search.facethierachylink | 2@11 |
| .... | .... |
| .... | .... |
| .... | .... |
| Boe.search.facethierachylink | 10@45 |

Fig. 9

First Pass Facet Hierarchy Generation Phase Pseudo-code:

1. Retrieve the Index Handle on the created index
2. Get all lucene term docs from the IndexHandle
3. Create Term to search for documents of type:facet.hierarchy
4. For all facet-hierarchy documents found
   a. Check if facet-hierarchy document objectId belongs to the current set of Ids for content store generation
   b. If yes,
      i. add it to the list of delta-facet-hierarchy-docs
      ii. Clear facet hierarchy doc Id from deltaLuceneIds to be processed in this iteration
   c. Else
      i. Skip facet hierarchy document
5. For all delta Facet hierarchy document ids
   a. get the facet hierarchy document from the index
   b. Read all the facet hierarchy field values from the document
   c. Read categoryIdCounter from summary document
   d. For each facet hierarchy field values
      i. Tokenize the facet hierarchy field to get the individual categories
      ii. Initialize value_ParentId to -1
         1. For each category found
            a. Unpack the category to find parent and child category
            b. For parent category
               i. Check whether category is present in Category_Index
               ii. If not present, add category to Category_Index
               iii. Generate parent category info for parent, with following parameters
                    categoryId = categoryIdCounter (parentCategoryId)
                    facetParentId = -1
                    valueParentId = -1
                    category Term = category name;
               iv. Update Category_Master and Category_Index files with parent category info
               v. Increment categoryIdCounter
            c. For child category
               i. Check whether category is present in Category_Index
               ii. If not present, add category to Category_Index
               iii. Generate category info for child, with following parameters
                    categoryId = categoryIdCounter
                    facetParentId = parentCategoryId
                    valueParentId = value_ParentId
                    category Term = category name;
               iv. Update Category_Master and Category_Index files with child category info
               v. Increment categoryIdCounter
            d. Set Value_ParentId to child CategoryId
            e. Update Hierarchy_Links_Index in the format childId@parentId link.(add zeroes, to group all parents together)

```
Second Pass Facet Hierarchy Generation Phase Pseudo-code:

Generation of Category_Parent_Master and Category_Parent_Index file to link the categories.

1.      Open index reader for Hierarchy_Index document.
2.      Get all the terms for childParentlinks from the index
3.      While there are no more terms left in the index to process
        a.      Process term, get child parent link
                i.      Tokenize term on the 'link delimiter' to get term_child_id - term_parent_id
                        link
                ii.     Set current_childId to the term_child_id found in the current term
                iii.    While current_child_Id is equal to term_child_id
                        1.      Read all parent ids for current_parent_id into parent_ids_list
                        2.      Store current_child_Id to dump_ChildInfo_id
                iv.     If current_childId changed,
                        1.      Get filepointer for Category_Parent_Master file
                        2.      Seek to dump_childinfo_Id in Category_Parent_Index file and write
                                current file pointer address
                        3.      If parent_ids_list is empty
                        4.      Write -1 in the Category_Parent_Master file to indicate no parents
                                exist for the child Id
                        5.      else
                        6.      Write parent_ids_list to Category_Parent_Master file
                        7.      Write -2 in the Category_Parent_Master file to indicate the end of
                                categories list
                v.      If no terms exist
                        1.      Exit
```

GENERATING DYNAMIC HIERARCHICAL FACETS FROM BUSINESS INTELLIGENCE ARTIFACTS

TECHNICAL FIELD

The present disclosure relates generally to business intelligence, and more particularly, to generating dynamic hierarchical facets from business intelligence artifacts.

BACKGROUND

In the present business environment, corporations are demanding more real-time information to make sound and time-critical business decisions. Business Intelligence (BI) has been used to support and improve such business enterprise decision making. BI tools are commonly applied to business data, such as sales revenue, costs, income, or other financial data. These tools are designed to spot, retrieve and analyze business data and to provide various historical, current and predictive future views of business operations. Common functions of BI tools include reporting, data exploration, data mining, data cleansing, information management, and business performance management. Many BI tools create, maintain, or consume files such as documents, reports, dashboards, and the like.

With the enormous amount of data and information available in our data centers today, it is not only important for the customers to be able to search the data in a matter of few milliseconds, but also be able to navigate through the information in a meaningful and organized manner. The data deluge that every enterprise experiences today calls for more and more efficient and accessible ways to find the needle in the haystack. As the overall number of documents stored in BI repositories grows, so does the average number of documents returned by each search.

FIG. 1 illustrates how the number of matching search results may mirror the exponential growth in overall content. Organizations may have exponential growth, or forecast exponential growth. As data grows, the number of matching documents returned by the search engine grows. For example, if a broad search matches 10% of the documents, then it would match 100 documents out of a total of 1,000 documents. If the same search is run later when there are now 2,000 total documents, it will return in the order of 200 documents in the results. Even though this may not be the case for every search (e.g., overall makeup of the documents may change over time, or specific terms may come and go), the number of matching documents generally tends to grow mirror the overall data growth. Better relevancy or "document ranking algorithms" will certainly buy some time; but each time the number of matching documents increases, the effectiveness of even the best algorithms will eventually fail.

The generation of facets (or categories) along with the search results has added a new paradigm to the way users find information. Each facet associates a value with each item in the search results, which enables the grouping of the search results into different categories. There are two types of facets: metadata and content. Metadata facets are generated from metadata fields, such as type of document, document creation time, location of document, author, etc. Content facets are generated from the content inside BI artifacts. Although facets provide a useful tool for users to filter search results, there are many limitations with conventional facet generation techniques. For example, a large number of facets have to be generated for matching BI artifacts that have no particular structure. This can be overwhelming for the end user, and makes it difficult to navigate to find the exact BI artifacts one is looking for. In addition, current implementations of facet hierarchy in search engines (e.g., Amazon, Ebay, etc.) have a static structure and a fixed number of levels, providing no way of dynamically generating content facets based on matched BI artifacts for a given search query.

Even further, there is no proper grouping of similar facets, even though there are many interrelated facets in databases. For example, a hierarchy found in the underlying data is not leveraged to dynamically link facets in other BI documents. Similar or incomplete hierarchies found in different BI artifacts are not grouped contextually to provide more meaning. Further, there is no provision for end users to manage the structure or name of the facets, especially with customer-specific or company-specific terminology for the data. For example, "Location" & "Geography" may mean the same thing for a specific customer. However, if one wants to group these facets, conventional technology does not allow for it.

Accordingly, there is a need to provide an improved indexing and searching technology that allows for more meaningful grouping of facets and to provide context to search results.

SUMMARY

Described herein are systems and methods for generating dynamic hierarchical facets from business intelligence artifacts. In accordance with one aspect of the present disclosure, grouping information is extracted from one or more business intelligence artifacts or a semantic layer. Facets or categories are dynamically linked based on the extracted grouping information to generate one or more hierarchical facets. The hierarchical facets may be incorporated in search results to facilitate ease of navigation.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Some embodiments are illustrated in the accompanying figures, in which like reference numerals designate like parts, and wherein:

FIG. 2a shows exemplary reports generated by a BI platform;

FIG. 3a shows another set of exemplary reports;

FIG. 9 shows an exemplary hierarchy index document;

FIGS. 10a-b show the exemplary pseudo-code for implementing the first and second phases of dynamic facet hierarchy generation;

DETAILED DESCRIPTION

Figure 1:
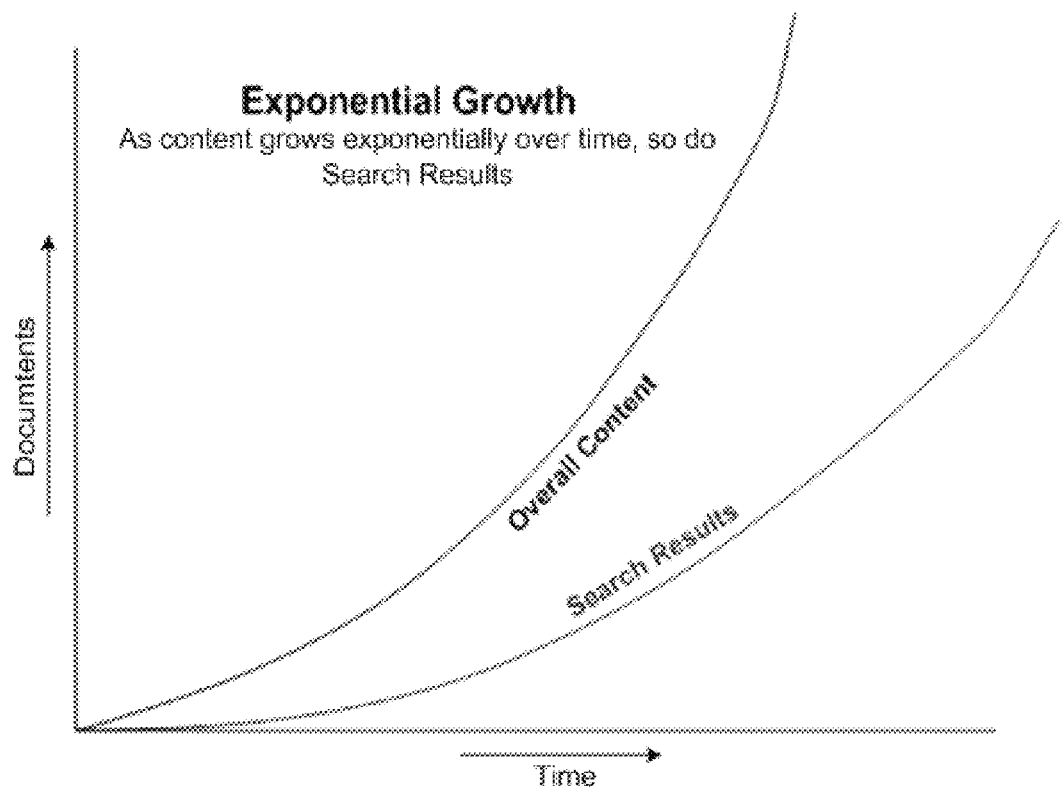
FIG. 1 illustrates the increase in matching search results as the document number grows.

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent in their performance. It should be noted that the term "facet" may be used interchangeably with the term "category" as appropriate in the description herein and in the claims that follow.

The following description sets forth one or more implementations of systems and methods for facilitating context-aware dynamic hierarchical facet generation. One aspect of the present disclosure advantageously provides dynamic structuring of facets or categories by leveraging the grouping information (e.g., list of values, hierarchy information) present in the semantic layer and/or BI artifacts. Unlike conventional methods, facets generated by the present framework may have a dynamic structure without any limit on the depth (or number of levels) in the hierarchy. Similar or interrelated facets may be grouped contextually based on synonyms and/or taxonomy for a particular domain to provide more meaningful groupings. In addition, similar hierarchies found in underlying data may be leveraged to dynamically link categories in other BI documents.

In accordance with another aspect of the present disclosure, facets may be pre-defined during search time to filter the search results. This allows the product administrator or user to manage the structure or name of the facets with customer-specific or company-specific terminology for the data. For example, the user may define a hierarchical facet as follows: VP→Director→Manager→Lead→Engineer. In addition, metadata facets may be derived from metadata in the data repository to filter the search results. For example, users may create folders to organize documents. Metadata related to such folders, such as folder information, document type date of creation, etc., may be used to derive hierarchical facets to facilitate navigation of search results.

In accordance with yet another aspect, the facets or categories may be dynamically ranked in accordance with relevancy. In one implementation, the relevancy is determined by machine learning. The machine learning may be performed based on information of an individual user or group of users performing a similar role. Such information includes, for example, usage history and/or user profile.

Figure 2B:
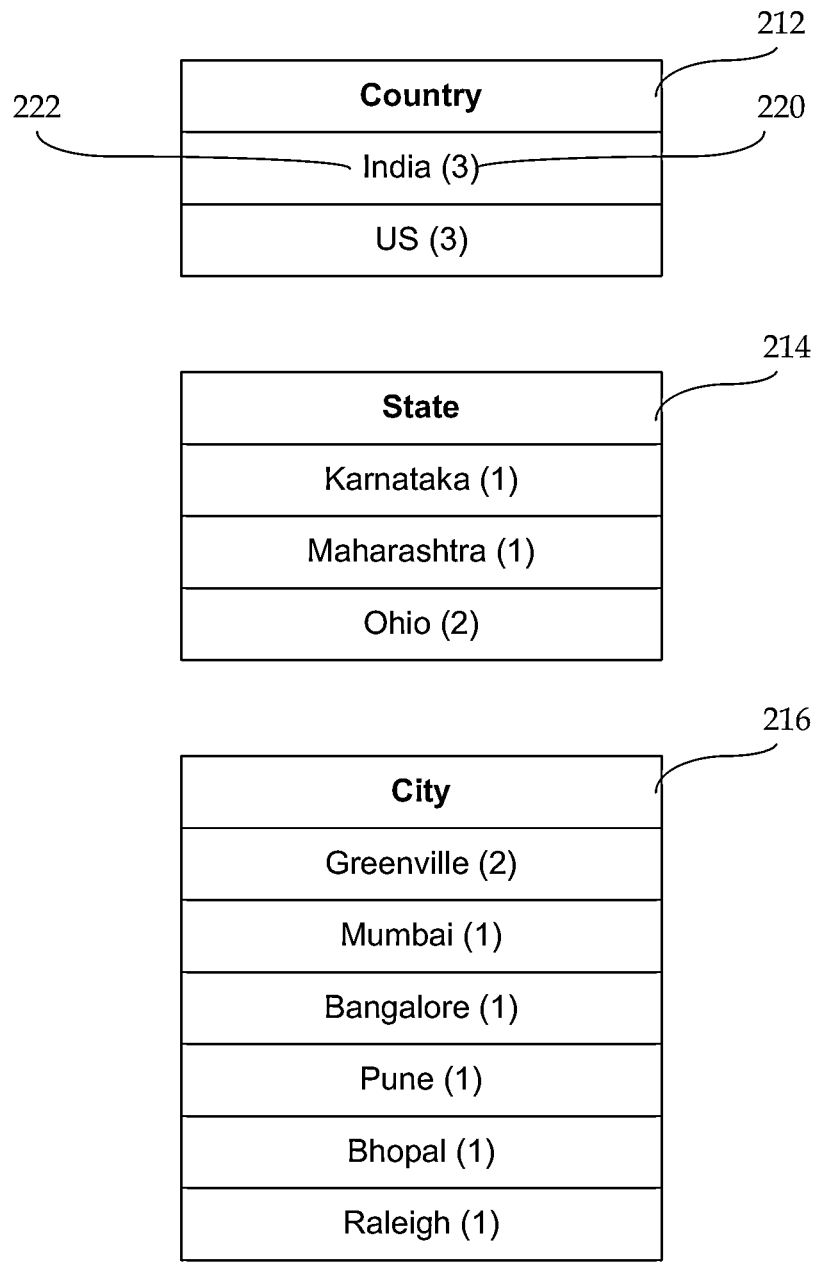
FIG. 2b shows facets generated from reports during a conventional search process.

FIG. 2a shows exemplary reports (202, 204, 206) generated by a BI platform. As shown, the reports 202 and 204 contain information about "Country," "State" and "City," whereas report 206 contains only "Country" and "City" information. FIG. 2b shows corresponding facets (212, 214, 216) generated from the reports (202, 204, 206) in FIG. 2a by a conventional indexing process. The count in parentheses (220) represents the number of documents that matched the respective member (222) of the facet. One problem with these facets, however, is that they do not allow the user to see the relationship between the facets (e.g., "Country" and "State") even though such relationships are defined in the report.

Figure 2C:
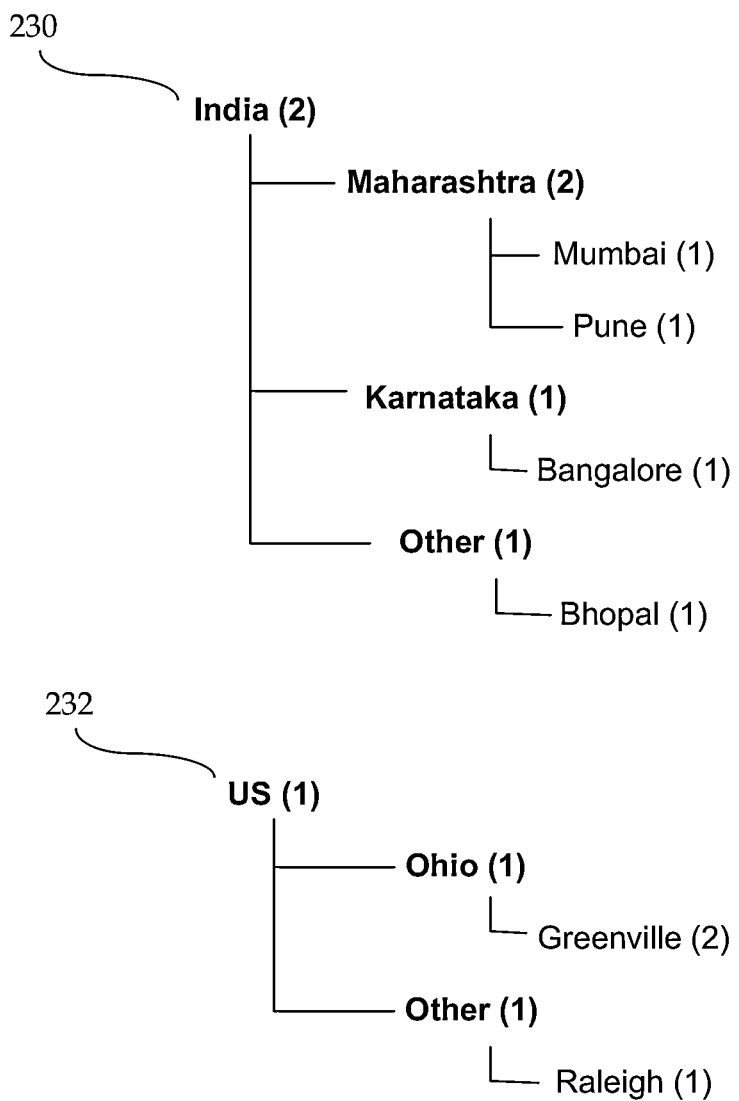
FIG. 2c shows hierarchical facets generated by one aspect of the present framework.

FIG. 2c shows corresponding hierarchical facets or categories (230, 232) generated by one aspect of the present disclosure. As shown, the hierarchical facets (230, 232) correspond to different countries (e.g., "India," "US"), which include different sub-categories corresponding to different states (e.g., "Maharashtra," "Karnataka," etc.), and sub-sub-categories corresponding to different cities (e.g., "Mumbai," "Pune," etc.). A miscellaneous sub-category denoted as "Other" is generated during run-time to group similar facets at the same level that do not belong to any other defined parent level. For example, "Bhopal" and "Raleigh" are placed in "Other" sub-categories, since they are cities (not states) belonging to "India" and "US" respectively. This allows grouping of similar facets, even in incomplete hierarchies, to provide more contextual meaning.

From these hierarchical facets, the user may easily deduce the logical relationship of, for example, "Bangalore" belonging to "Karnataka," which in turn belongs to "India." The user may also better understand and navigate the structured data by viewing different groupings of similar information. In addition, unlike conventional static implementations, such facet hierarchy is "dynamic," since it is generated during run-time, without being limited to a pre-defined or fixed number of levels.

FIG. 3a shows another set of exemplary reports (302, 304). The reports (302, 304) contain information about the "Office Location," "Company Name" and "Department." A conventional BI framework does not provide any means for the user to define a relationship between, for example, "Office Location," "Company Name" and "Department." Such relationship may be useful in exploring companies belonging to a specific location. To find companies belonging to "San Francisco," the user will have to open each report to see the relationship. Such navigation through different categories may become very cumbersome and difficult.

Figure 3B:
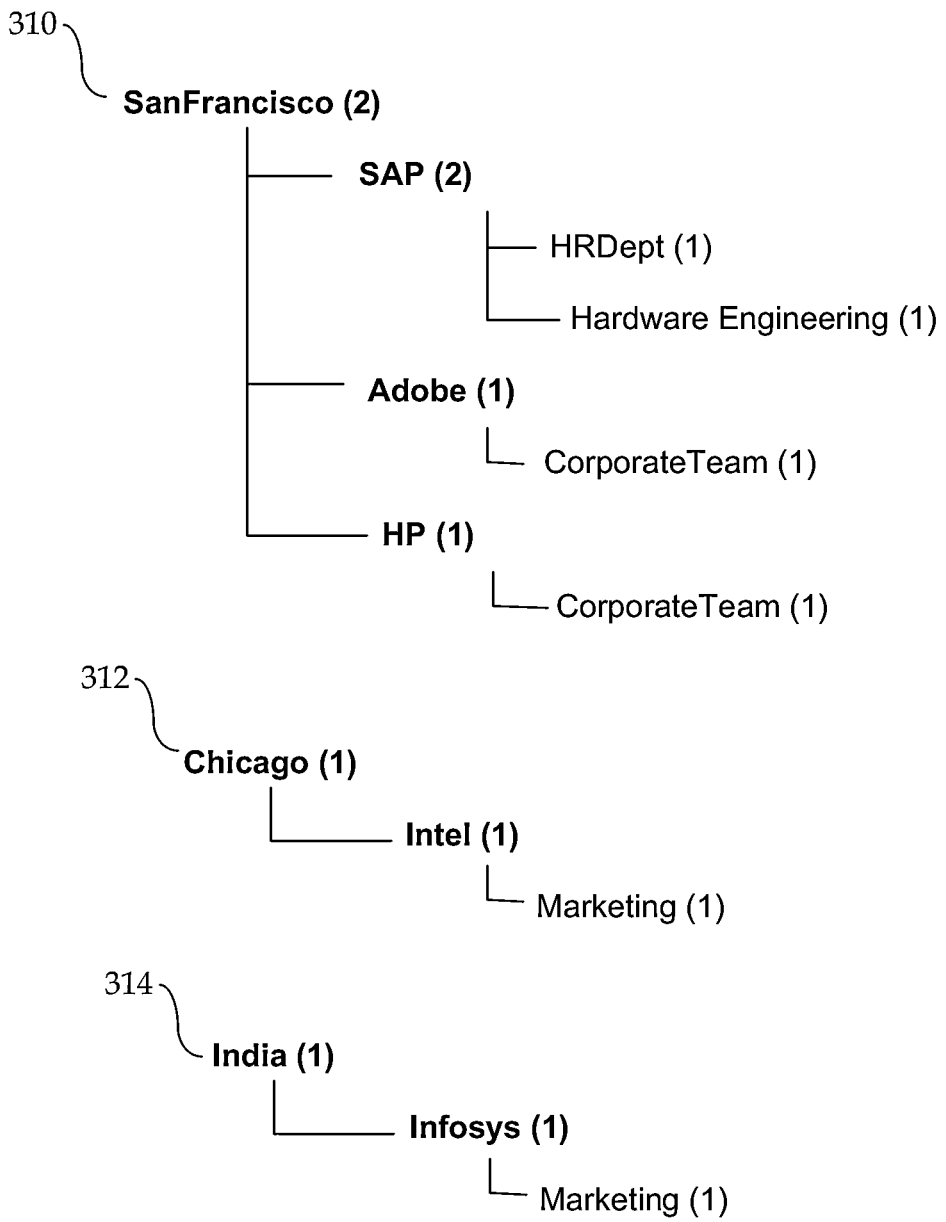
FIG. 3b shows hierarchical facets generated by one aspect of the present framework.

FIG. 3b shows corresponding hierarchical facets (310, 312, 314) generated by one aspect of the present disclosure. The hierarchical facets (310, 312, 314) may be dynamically generated from pre-defined relations between categories. For example, before run-time, a user may pre-define a relation between the categories, such as: "Department" belongs to "Company" which in turn belongs to "Office Location." The structured facets provide a more comprehensible view to the user, and more flexibility in managing the name or structure of the facets. For instance, the user is free to use client-specific terminology to name the facets, and/or to group facets that mean the same thing, but have been assigned different names (e.g., "Location" and "Geography" facets).

The framework described herein may be implemented as a method, computer-controlled apparatus, a computer process, a computing system, or as an article of manufacture such as a non-transitory computer-readable medium. These and various other features will be apparent from the following description.

Figure 4:
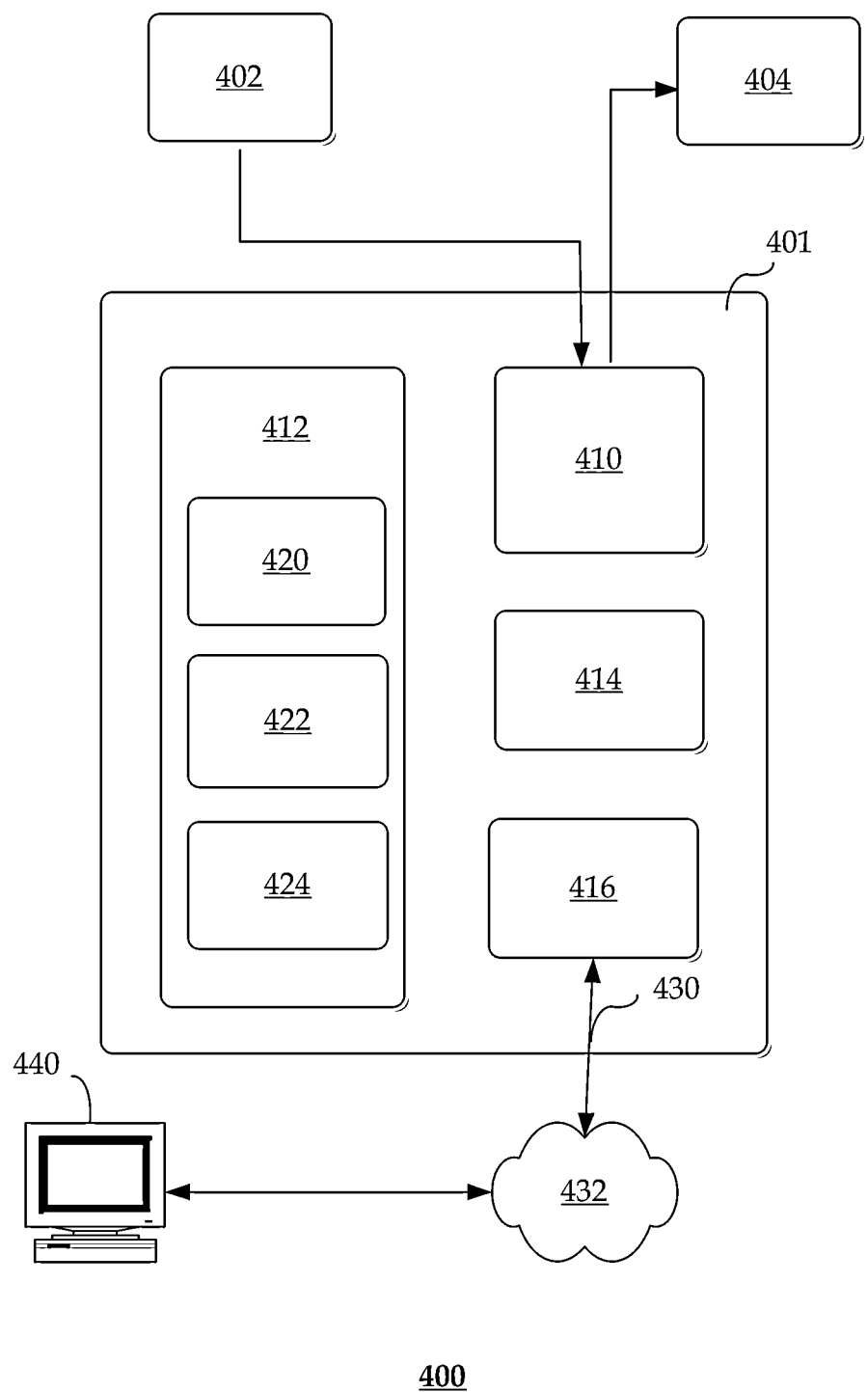
FIG. 4 is a block diagram illustrating an exemplary system.

FIG. 4 is a block diagram illustrating an exemplary system 400 that implements the framework described herein. The system 400 includes one or more computer systems 401, with FIG. 4 illustrating one computer system 401 for purposes of illustration only.

Turning to the computer system 401 in more detail, it may include a central processing unit (CPU) 414, an input/output (I/O) unit 410, and a non-transitory computer-readable medium 412. Non-transitory computer-readable medium 412 stores machine-executable instructions, data, and various programs, such as an operating system 420, a graphical user interface (GUI) module 422, and a business intelligence tool 424, all of which may be processed by CPU 414. As such, the computer system 401 is a general-purpose computer system that becomes a specific purpose computer system when executing the machine-executable instructions. Alternatively, the technology described herein may be implemented as part of a software product, which is executed via the operating system 420. It should be noted that the various components (420, 422, 424) may be hosted in whole or in part by different computer systems in some implementations. Thus, the techniques described herein may occur locally on the computer system 401, or may occur in other computer systems and be reported to computer system 401. Although the environment is illustrated with one computer system, it is understood that more than one computer system or server, such as a server pool, as well as computers other than servers, may be employed.

In addition, each program may be implemented in a high-level procedural or object-oriented programming language, or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

The GUI module 422 comprises machine-executable instructions to generate graphical components of a user interface. It is understood that the user interface may also comprise non-graphical or textual components. For example, exemplary windows, icons, buttons, menus or the like, may be generated, as will be discussed later. The user interface may further include instructions to receive input from an input device 402 and display the graphical components on an output device 404.

The business intelligence tool 424 comprises tangibly encoded machine-executable instructions to perform intelligence-related functions on computer system 401, client system 440, or across network 432. Intelligence-related functions refer to functions that are operable, via an interface, to retrieve and analyze data from various information sources. Such intelligence-related functions include, but are not limited to, business intelligence (BI) functions such as generating reports (locally or on a server), viewing a report, performing search and analysis, mining data, cleansing data, performing Online Analytical Processing (OLAP), managing business performance, presenting information via a dashboard and so forth. In one implementation, the business intelligence tool 424 includes an indexer, a search module and a BI content extractor, as will be described with reference to FIGS. 5a-b. It should be understood that the components (420, 422, 424) stored in computer-readable medium 412 are merely exemplary and additional modules or sub-modules may also be provided. In addition, the functions of the components (420, 422, 424) may be combined. A function of a module need not be performed on a single machine. Instead, the function may be distributed across system 400 or a wider network, if desired.

Non-transitory computer-readable medium 412 may be any form of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks, magneto-optical disks, and Compact Disc Read-Only Memory (CD-ROM).

In one implementation, computer system 401 is coupled to an input device 402 (e.g., keyboard or mouse) and an output device 404 (e.g., monitor or screen). The output device 404 may be used to display the reports generated by a report generating unit. In addition, computer system 401 may also include a communications card or device 416 (e.g., a modem and/or a network adapter) for exchanging data with a network 432 using a communications link 430 (e.g., a telephone line, a wireless network link, a wired network link, or a cable network). Other support circuits, such as a cache, power supply, clock circuits and a communications bus, may also be included in computer system 401. In addition, any of the foregoing may be supplemented by, or incorporated in, application-specific integrated circuits.

Computer system 401 may operate in a networked environment using logical connections to one or more remote client systems 440 over one or more intermediate networks 432. These networks 432 generally represent any protocols, adapters, components, and other general infrastructure associated with wired and/or wireless communications networks. Such networks 432 may be global, regional, local, and/or personal in scope and nature, as appropriate in different implementations.

Remote client system 440 may be a personal computer, a mobile device, a personal digital assistant (PDA), a tablet PC, a smart-phone, a server, a server pool, a router, a network PC, a peer device or other common network node, and typically includes many or all of the elements described above relative to computer system 401. Client system 440 may also include one or more instances of non-transitory computer readable storage media or memory devices (not shown). The non-transitory computer readable storage media may include a client application suitable for interacting with the components (422, 424) over the network 432. The client application may be an internet browser, a thin client or any other suitable applications. Examples of such interactions include requests for reports. In turn, the client application may forward these requests to the computer system 401 for execution.

Figure 5A:
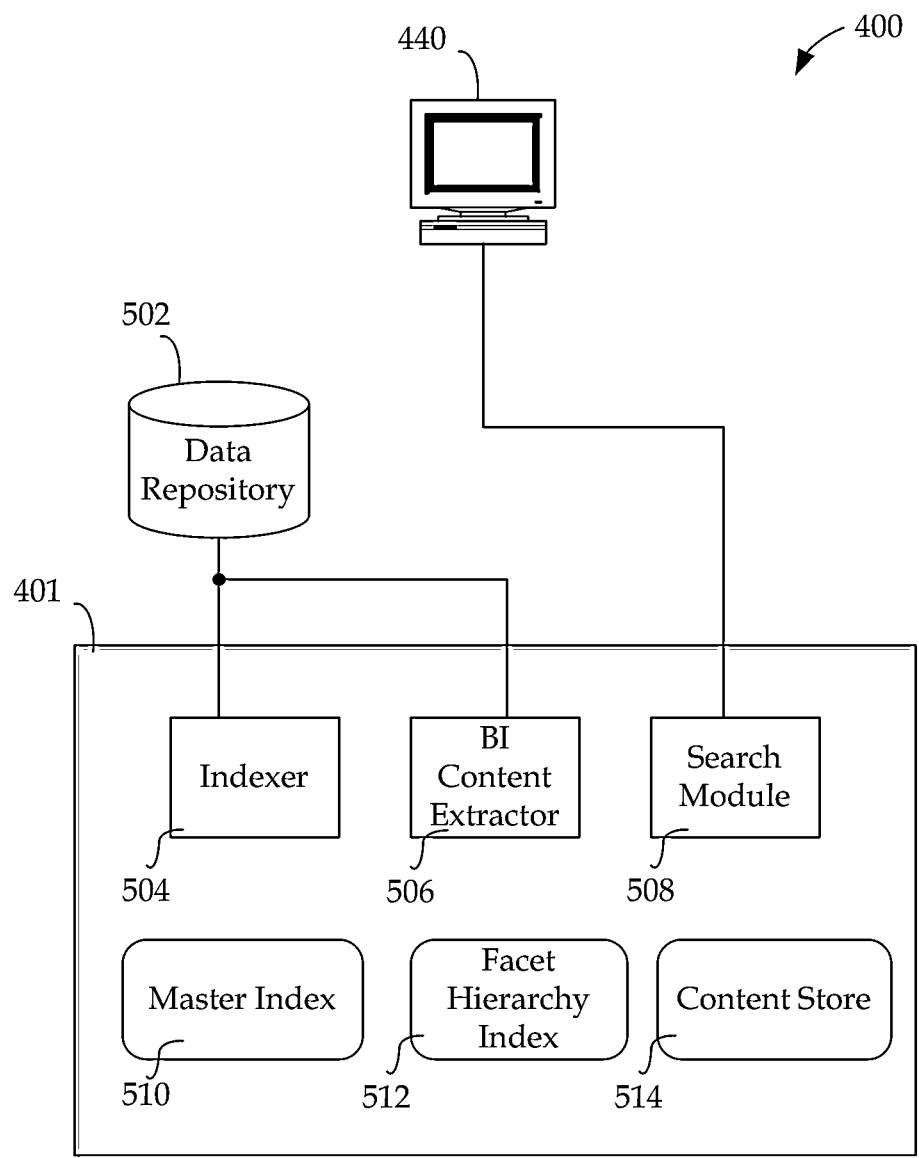
FIG. 5a shows an exemplary implementation of a system providing search functionality.
Figure 5B:
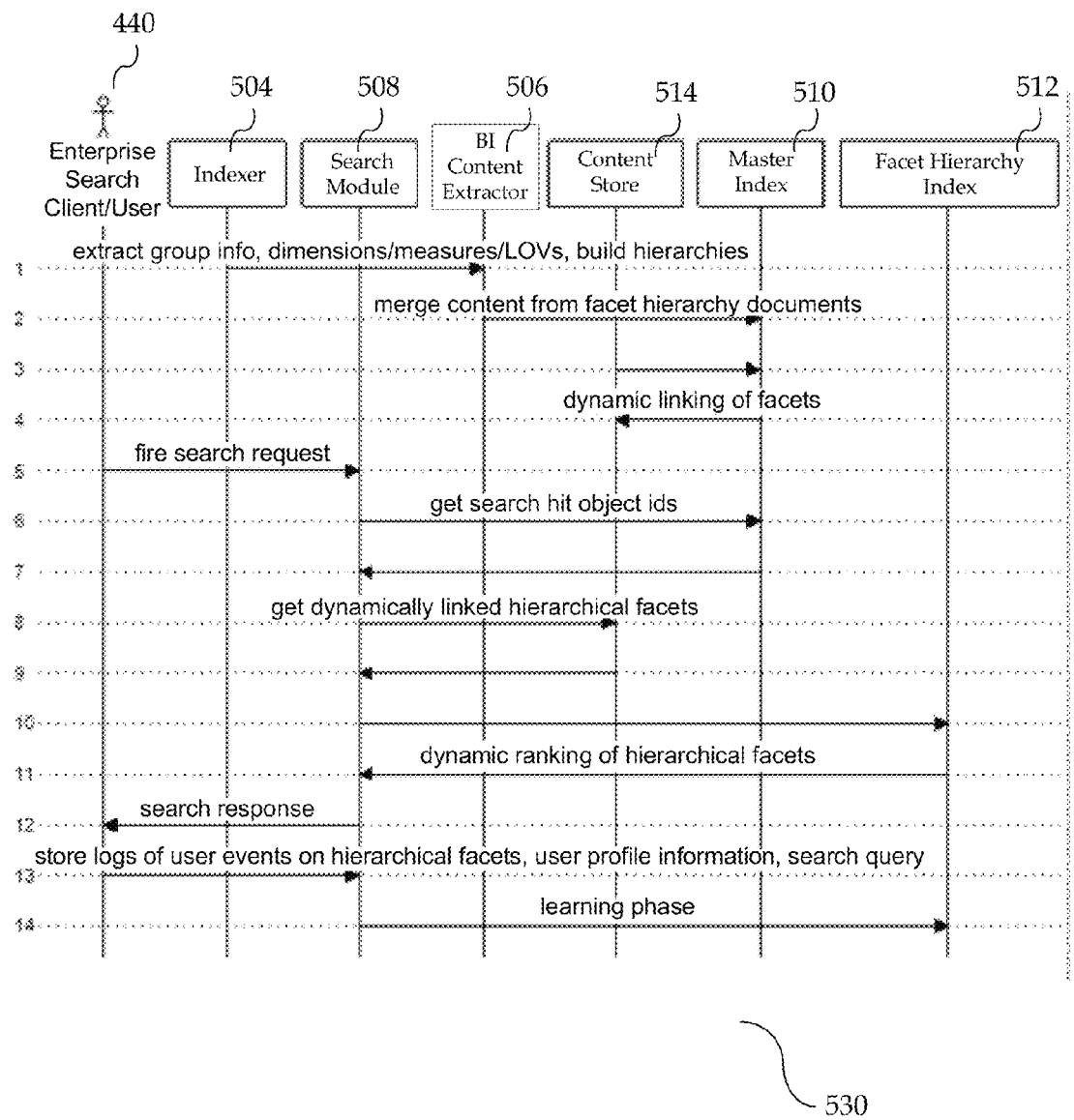
FIG. 5b illustrates an exemplary workflow sequence diagram.

FIG. 5a shows an exemplary implementation of system 400 providing indexing and searching functionalities, and FIG. 5b illustrates an exemplary workflow sequence diagram 530. As shown in FIG. 5a, system 400 may include a client system 440, a data repository 502 and a computer system 401. In one implementation, client system 440 submits a search query, and in response, computer system 401 provides a search result identifying one or more BI artifacts in the data repository 502. The search result may include metadata and/or other information of the identified BI artifacts. Although FIG. 5a depicts a search query passing from client system 440 directly to computer system 401, a search query may pass from client system 440 to computer system 401 through other or additional functional components according to some embodiments. In this regard, embodiments are not limited to the architecture of system 400.

Data repository 502 may include one or more storage devices for storing data. The data may include files of any type, including but not limited to Web pages, word processing documents, spreadsheets, Portable Document Format (PDF) documents, etc. In some embodiments, data repository 502 is a repository of a Business Intelligence (BI) system storing BI artifacts, such as report specifications, analysis cubes and metadata models. In SAP Business Objects solutions, for example, BI artifacts include Crystal Reports, Web Intelligence, Desktop Intelligence, Xcelsius, BusinessObjects Analysis, BI workspaces, and Information Spaces. BI artifacts may serve different purposes for different personas in the BI environment. Each BI artifact may have its own format and purpose. There may be some BI artifacts that have saved data, while others only store metadata. Different users may end up creating the same content in different representations for the same data. In addition, within the same type of document, the same data may be represented in different formats. The report designer may organize the content based on the convenience and requirements of the consumers.

In one implementation, computer system 401 may include an indexer 504, a BI content extractor 506 and a search module 508. Generally, the indexer 504 manages the reading and/or writing interface for the BI content extractor 506, which extracts and organizes information from the data in the data repository 502. In one implementation, the indexer 504 may be wrapper for a search platform, such as the Apache Lucene, the TREX search engine by SAP AG or any other indexing technology. The search module 508 manages search requests from the client system 440, and generates search results in response to the search requests.

FIG. 5b illustrates an exemplary workflow sequence of these components in more detail. As shown, the indexer 504 may identify BI artifacts from the data repository 502 to be indexed and extract grouping information from the identified artifacts and/or semantic layer objects for generating one or more dynamic hierarchical facets. The grouping information may include pre-defined or user-defined hierarchies. In one implementation, the indexer 504 extracts such hierarchical information and stores it in an intermediate form, such as a facet hierarchy document. The facet hierarchy document may be an index document that is added to the master index 510. The master index 510 may be a set of one or more index files that stores documents in a manner that provides very quick search responses. To achieve the quick responses, the index files may use a data structure called an inverted index, which maps each unique work in the index to the list of document identifies of all documents that contain the word. The index files may store the entire content of the documents in field-value pairs.

In one implementation, the BI content extractor 506 merges content from the facet hierarchy documents to generate one or more index documents. Such index files facilitate faster retrieval of facet hierarchical information. For example, the indexer 504 may generate a temporary hierarchy index document to store the mapping between facet parents and their respective children extracted from the facet hierarchy documents. The hierarchy index document may be stored in, for example, the master index 510.

In accordance with one implementation of the present disclosure, the BI content extractor 506 dynamically links the facets to generate dynamic hierarchies using the extracted grouping information (e.g., hierarchy index document). The BI content extractor 506 may generate a set of one or more mapping files (e.g., category parent mapping master and category parent mapping index) to store the mapping between value parent facets and their respective child facets. These mapping files may be maintained in the content store 514 for retrieval during search. The content store 514 stores a blueprint of a set of one or more flat files. See, for example, U.S. patent application Ser. No. 12/890,939 filed Sep. 27, 2010, which is herein incorporated by reference. By using a content store, document information may be retrieved at a much faster rate. Document identifiers stored in the master index 510 may be used to reference corresponding document information from the content store 514.

Figure 6A:
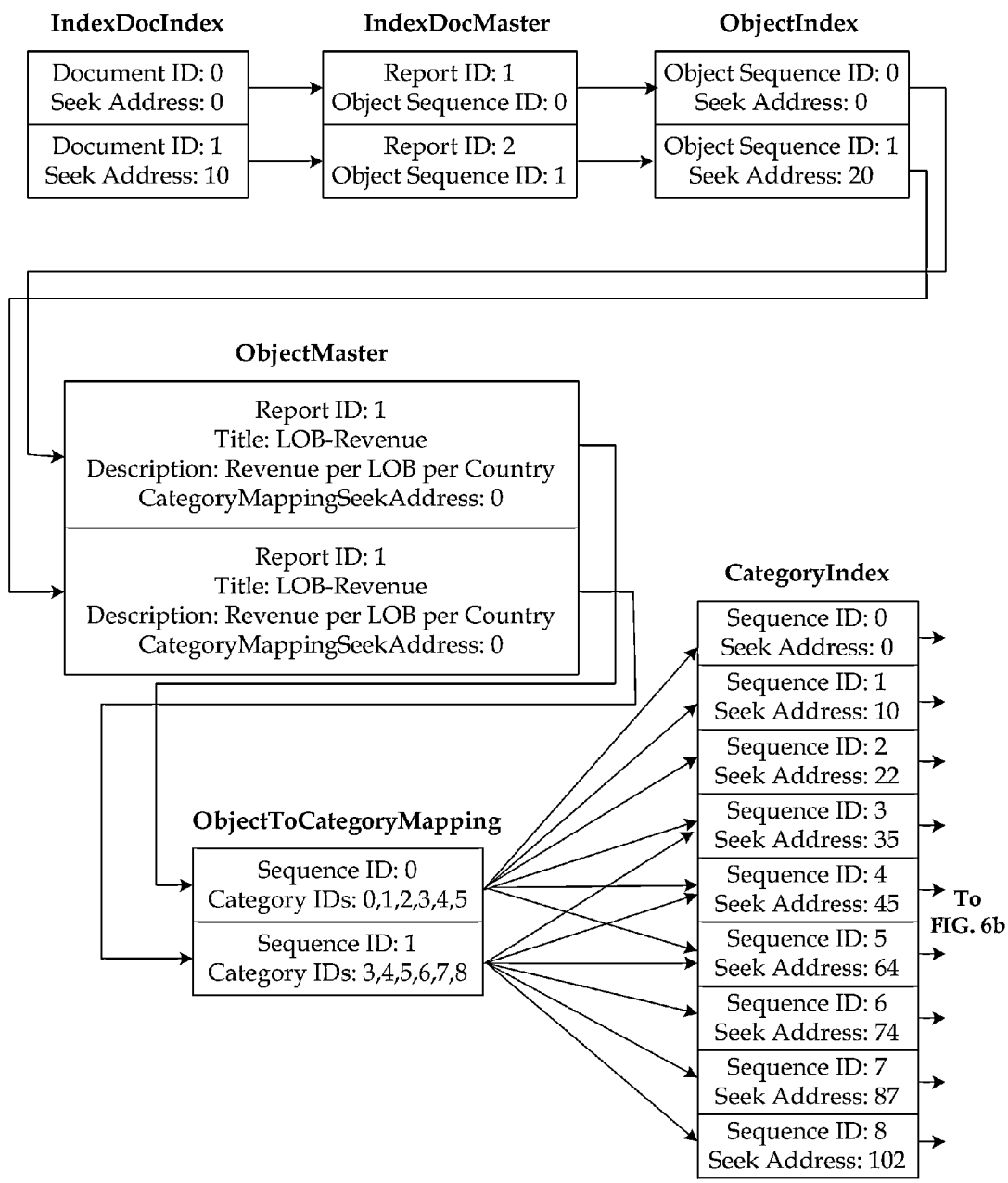
FIGS. 6a and 6b illustrate files of an exemplary content store.
Figure 6B:
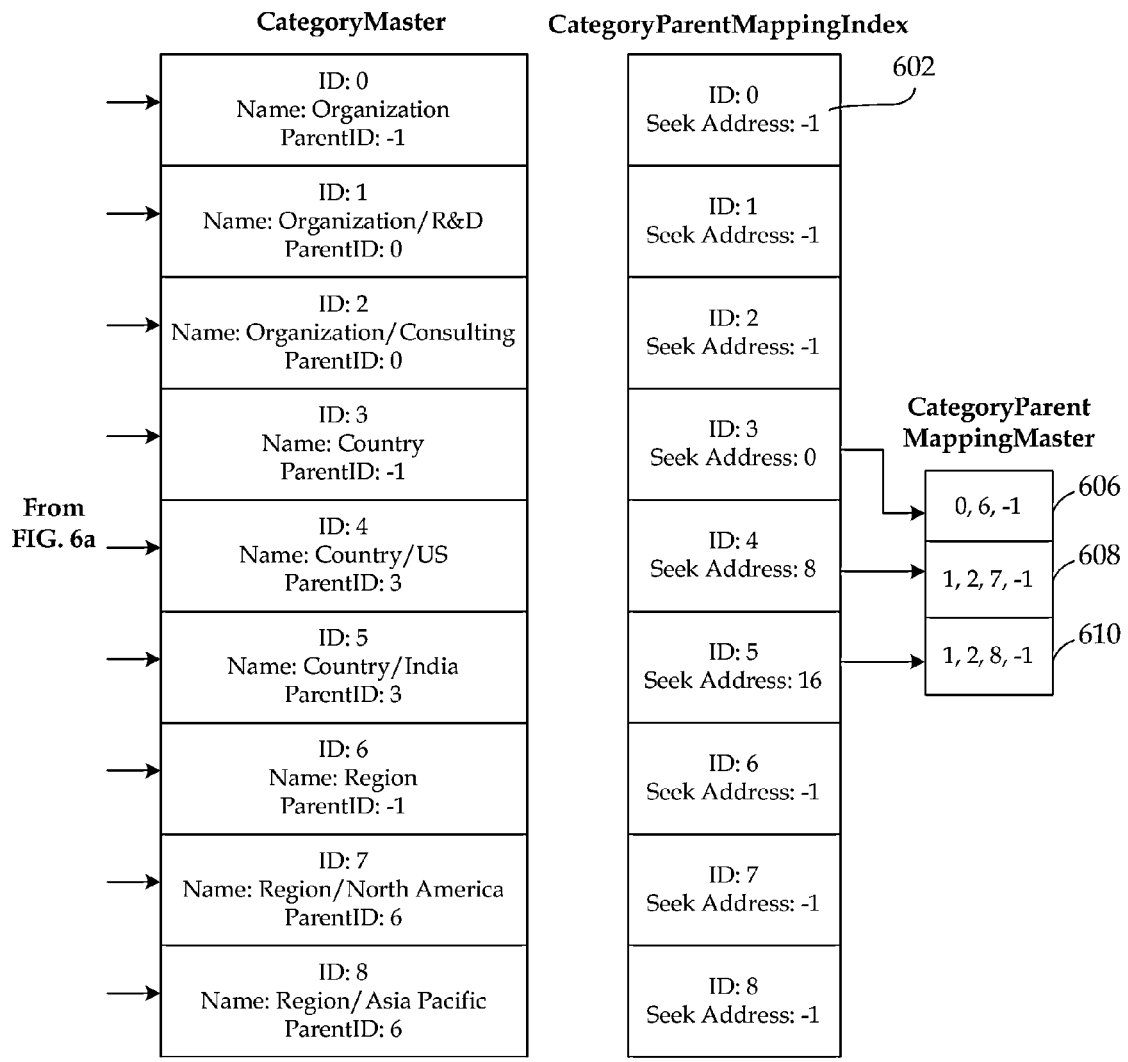

FIGS. 6a and 6b illustrate files of an exemplary content store 514 generated based on the following two exemplary reports:

Report 1
　Title: LOB-Revenue
　Description: Revenue per LOB per Country
　ID: 1
Report 1 contains one table, where Organization→Country forms a hierarchy, as shown below:

| Organization | Country | Revenue |
|---|---|---|
| R&D | US | 10000 |
| R&D | India | 5000 |
| Consulting | US | 30000 |
| Consulting | India | 8000 |

Report 2
　Name: Regional Profit
　Description: Profit by region by country
　ID: 2
Report 2 contains one table, where Region 4 Country forms a hierarchy, as shown below:

| Region | Country | Profit |
|---|---|---|
| North America | US | 40000 |
| Asia Pacific | India | 20000 |

During indexing, data or BI artifacts stored in the data repository 502 may be split into their constituent parts, such as tables and charts, and each constituent part is independently indexed. Each constituent part will be referred to as a document. In the afore-mentioned example, Reports 1 and 2 have one table each, and each table may be represented by a unique document identifier (ID) in the master index 510 and the content store 514.

As shown by FIGS. 6a and 6b, the content store 514 may include nine files: IndexDocIndex, IndexDocMaster, ObjectIndex, ObjectMaster, ObjectToCategoryMapping, CategoryIndex, category master, category parent mapping index, and category parent mapping master.

The IndexDocIndex file maps each document identifier of the master index 510 to a starting address of a record of an associated document in the IndexDocMaster file.

The IndexDocMaster file stores metadata about the index documents. Each record in the IndexDocMaster also has the SequenceID of the BI artifact corresponding to this index document. The address stored at this pointer location points to the metadata record for this object in the ObjectIndex table.

The ObjectIndex file stores the starting address (Seek Address) of each object's record in the ObjectMaster table. Each object may be assigned an Object Sequence ID, starting at 0, when its metadata is stored in the ObjectMaster file. The ObjectIndex file maintains the mapping between an Object Sequence ID and its corresponding record in the ObjectMaster file.

The ObjectMaster file stores metadata records for each BI artifact in the data repository 502. The data structure of the ObjectMaster file permits the storage of any number of metadata fields (e.g., Title, Description, etc.). Each record in the ObjectMaster file includes a pointer, CategoryMappingSeekAddress, to an address in the ObjectToCategoryMapping table that holds the list of categories (or facets) for the corresponding BI artifact. The categories of a BI artifact include the various fields of the BI artifact and their corresponding values. Some fields of a particular BI artifact (e.g., the Country column of a table) may be associated with several values (e.g., US, India, etc.), and these field-value associations may be reflected in the list of categories stored in the content store.

The ObjectToCategoryMapping file contains mappings between an object and the object-level categories (or facets) for that object. Examples of object-level facets are object type (e.g., Web Intelligence, Crystal Report) and folder path. The ObjectToCategoryMapping file also contains mappings between a document identified in the master index 510 and categories corresponding to that document. Each record in the ObjectToCategoryMapping file contains a list of Category IDs.

The category index file contains the starting address (Seek Address) of each record in the category master file. Each unique category (or facet) is assigned a Sequence ID starting from 0 when it is stored in the category master file. Analogous to the ObjectIndex file, the category index file maintains mappings between the Category Sequence ID and the Seek Address of the category's record in the category master file.

The category master file stores value information (e.g., category name, a parent facet identifier (ParentID)) for each unique category. Each unique category is assigned a unique ID starting from, for example, 0 or an increment from the last used ID that may be stored in a summary document. In this example, the categories "Organization/R&D," "Organization/Consulting," "Country/US," "Country/India," "Region/North America" and "Region/Asia Pacific" are value facets since they refer to values in the report documents (Report 1 and Report 2), while "Country," "Organization" and "Region" are parent facets of these value facets.

The category parent mapping index maintains the mappings between the category ID and the starting address (Seek Address) of the corresponding record in the category parent mapping master. Categories that are at the root of their respective hierarchies do not have parent mapping lists. The Seek Address is set to "−1" to denote this. For example, since "Organization" is at the root of the hierarchy "Organization→Country", the Seek Address in its record 602 is set to −1.

Each record in the category parent mapping master file stores a list of parent IDs terminated by "−1." The list corresponds to a child category in the category parent mapping index. For example, the record 606 shows that child category "Country" (ID: 3) is associated with 2 parent categories "Organization" (ID: 0) and "Region" (ID: 6). Accordingly, the record 606 represents the following hierarchical facets:
Organization→Country; and
Region→Country.

Record 608 stores 3 parent category IDs (1, 2, 7), since child facet value "Country/US" (ID: 4) has 3 parent facet values: "Organization/R&D," "Organization/Consulting," and "Region/North America." Thus, record 608 represents the following hierarchical facets:
Organization/R&D→Country/US;
Organization/Consulting→Country/US; and
Region/North America→Country/US.

Similarly, record 610 stores 3 parent category IDs (1, 2, 8), since child facet value "Country/India" (ID: 5) has 3 parent facet values: "Organization/R&D," "Organization/Consulting," and "Region/Asia Pacific," thereby representing the following hierarchical facets:
Organization/R&D→Country/India;
Organization/Consulting→Country/India; and
Region/Asia Pacific→Country/India.

Referring back to FIG. 5b, when the user initiates a search query at the client system 440 to retrieve search results, the search module 508 queries the master index 510 to determine identifiers of BI artifacts that contain the search terms to generate search hit reports. In addition, the search module 508 may retrieve dynamically linked hierarchical categories (or facets) from the content store 514 based on the given search terms. Further, the search module 508 may query the Facet_Hierarchy_Index file 512 to determine the dynamic ranking of the hierarchical facets. The hierarchical facets may be sorted in accordance with the dynamic ranking scores of the hierarchical facets, and incorporated into the search results, along with the actual search hit reports. The search results may be formatted in a client friendly format and then sent to the client system 440 for presentation to the user.

During the learning phase, the client system 440 sends logs of user events on the hierarchical facets, user profile information, search query, etc. to the search module 508. The search module 508 may statically and/or dynamically rank the hierarchical facets and update the Facet_Hierarchy_Index file 512. The Facet_Hierarchy_Index file 512 stores the starting addresses and search term information of facet hierarchy term information files, as will be described in more detail in the following description.

Figure 7:
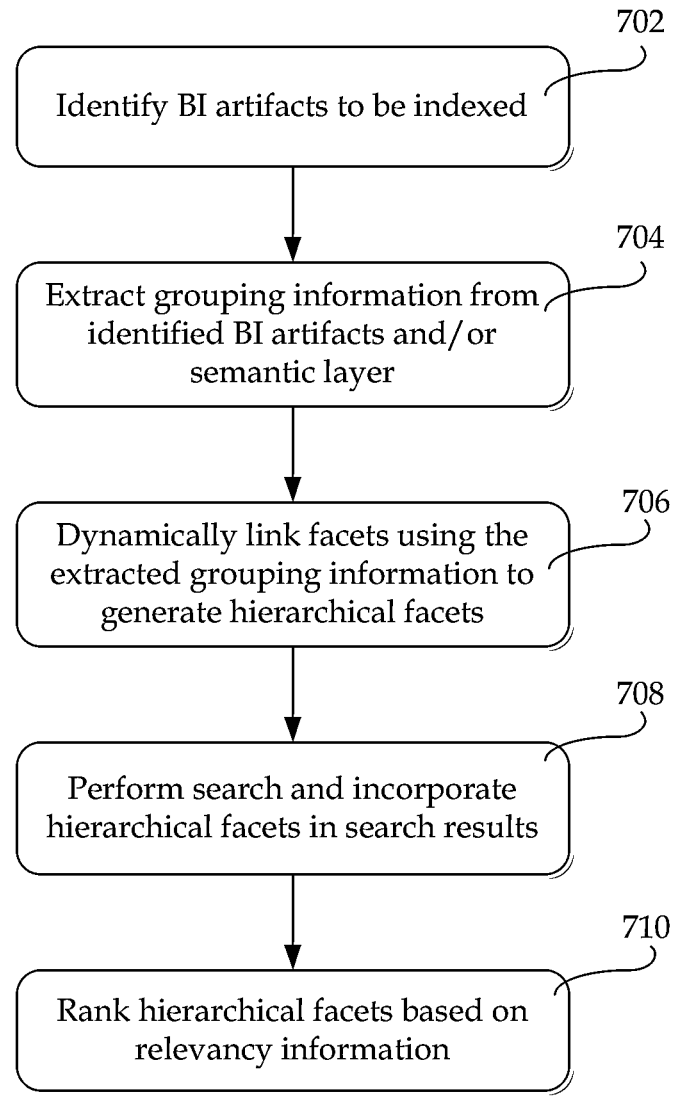
FIG. 7 shows an exemplary dynamic category generation method.

FIG. 7 shows an exemplary category generation method 700. The exemplary method 700 may be implemented by the computer system 401, as previously described with reference to FIGS. 4 and 5a-b.

At 702, the BI artifacts to be indexed are identified. BI artifacts include, for example, report specifications, analysis cubes and metadata models. In one implementation, the indexer 504 periodically crawls the data repository 502 in search of new or modified artifacts. The artifacts may be added or modified by, for example, the user operating the client system 440. For example, the user may operate a reporting tool executed by the client system 440 to design a report specification, and save the new report specification back to the data repository 502 using the reporting tool.

At 704, grouping information is extracted from the identified BI artifacts and/or semantic layer objects. Grouping information may include, for example, hierarchical information, dimensions, measures, filters, prompts, list of values (LOVs) or a combination thereof. Such grouping information may be used to derive dynamic hierarchical facets that have not been previously defined. For example, the hierarchies (or hierarchical information) extracted from the semantic layer may be used to contextually group data from other BI artifacts.

The semantic layer hides the complexity of the data warehouse by including a set of abstract entities known as semantic layer objects, each of which maps one or more physical artifacts stored in the data repository 502 to common business terms. The semantic layer objects may exhibit additional properties (i.e. metadata), such as one or more data values (e.g., list of text or numeric values), a "qualification" (e.g., dimensions, filters, measures, etc.), a structure (e.g., online analytical processing or OLAP hierarchies), a "business type" (e.g., financial, time, geography, etc.) and so forth. The semantic layer may contain repositories of raw classified data from which enormous amount of valuable information can be inferred and extracted. The hierarchies defined in the semantic layer may be used to provide a context to the search results, which provides the user a greater understanding of the underlying data and enhances ease of navigation. Through the use of such context, dynamic hierarchies that have not been previously defined may be derived.

In one implementation, hierarchical information of a BI artifact is stored in an intermediate data structure during extraction in the following form:

Hier1: <dim1/dim2/dim3 . . . /dimn> where dim1, dim2 are the dimensions in the BI artifact, and Hier1 is an empty hierarchy structure which is used to create the full hierarchy path with subsequent values. This data structure may also be used for configuring defined hierarchies.

Defined hierarchies include pre-defined and user-defined facet hierarchies. Pre-defined hierarchies are generic and commonly-known hierarchies in the BI artifacts. They may be customized by, for example, product administrators. One example of a pre-defined hierarchy is the geographical hierarchy: <Country/State/Region/City>. Another example of a pre-defined hierarchy is the date hierarchy: <Year/Month/Day>. User-defined hierarchies may be customized by the end-user based on known dimensions of the underlying data. It provides flexibility to the end-user in grouping data based on the user's own understanding of the underlying structure. For instance, a customer may want to modify or add certain hierarchies based on client-specific business terminology. An example of a user-defined hierarchy is: <Location/Office/Department>.

For each hierarchy structure {h1, h2, h3, . . . , hn} extracted from the BI artifact or content layer object, hi=fhi__1/fhi__2/fhi__3/ . . . /fhi_n; and fhi_i denotes a facetName (i=1, 2, 3, . . . , n). Each facet comprises of a facetName and a facetValue. A facet is stored in the format <fp/fv>, where fp is the facetName and fv is the facetValue. In the case of metadata and document facets, the facetName is the Object property (e.g., document kind, author, data source for the BI document). In the context of content facets, the facetName may be the dimension, measure, or group from which the content of the BI document is extracted.

Figure 8:
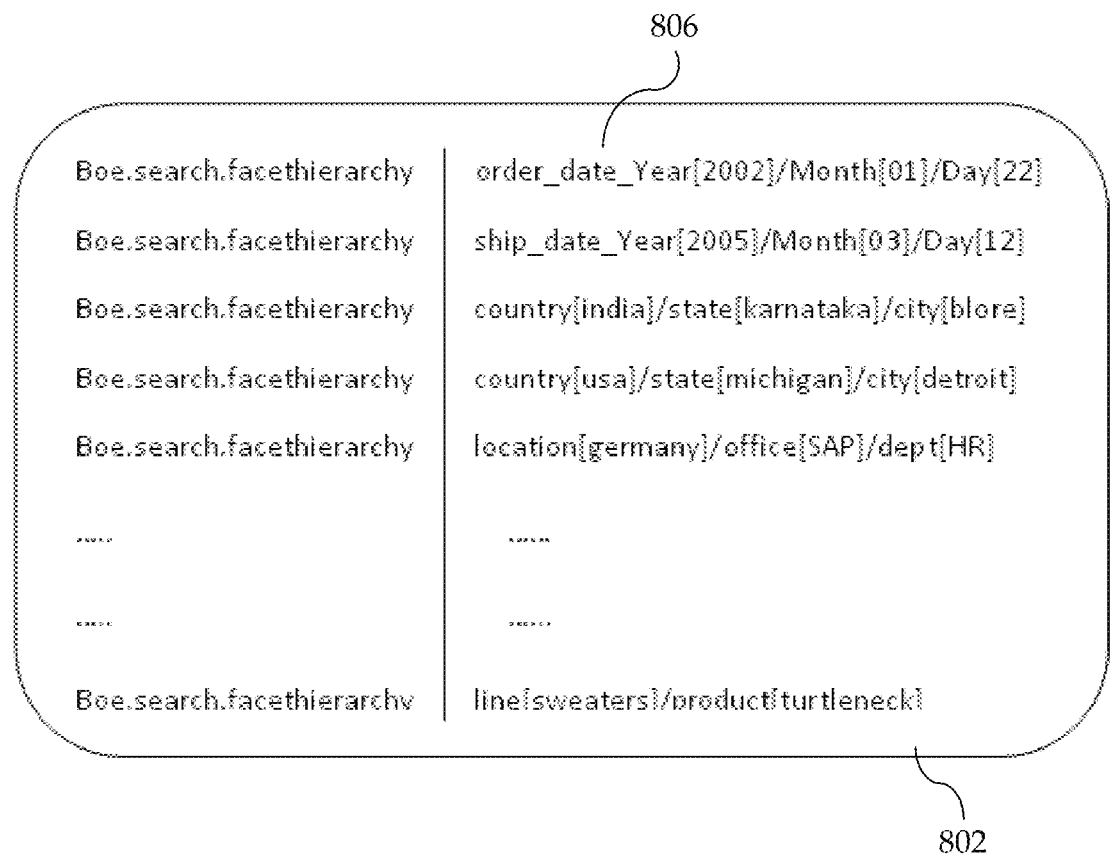
FIG. 8 shows an exemplary facet hierarchy document.

The values in the hierarchy structures may be extracted to create a full hierarchy path for the defined hierarchy. The hierarchy paths may be stored in an intermediate form, such as a facet hierarchy document. The facet hierarchy document may be processed in the content store generation phase to dynamically link the facets to form hierarchical facets, as will be described later with respect to step 706. FIG. 8 shows an exemplary facet hierarchy document 802. Although the facet hierarchy document 802 shown in FIG. 8 is a Lucene-type document, it should be understood that other types of formats may also be used to store the defined hierarchies. For example, if another search platform (e.g., TREX) is used to implement the present system, the facet hierarchy document may be provided in a different format that is compatible with the search platform. The facet hierarchy document may represent each full hierarchy path 806 in the following field-value format:

Boe.search.facethierarchy: fhi__1[value1]/fhi__1.1 [value1.1]/fhi__1.1.1[value1.1.1]/ . . . /fhi__1.1..n [value__1.1..n].

In one implementation, the full hierarchy path 806 includes a facet parent and/or a value parent. A facet parent for any child facet of the type <fp, fv> is another facet of the type <fp,>. The facet parent is typically another facet with the facetName of the child facet and facetValue being null. For example, for the facet, f1="Country/USA", the facet parent of f1 is another facet f2="Country!". A facet hierarchy defines a relationship between different facets. A value parent is the hierarchy parent of a facet. For a given hierarchy, the hierarchical structure may be in the format:

"gpN[gpV]/pN[pV]/facetName[facetValue]", where gpN denotes the grandParentName, pN denotes the ParentName, gpV denotes the grand Parent Value, pV denotes the parent Value, gpN/gpV is the value parent for pn/pv, and pn/pv is the value parent for facetName/facetValue.

For example, for the hierarchy="Country[India]/State[Karnataka]/City[Bangalore]", "Country/India" is the value parent of "State/Karnataka" which in turn is the value parent for "City/Bangalore".

In one implementation, to generate the facet hierarchy document 802, two intermediate data structures, "defined-hierarchy" list and "hierarchies" list, may first be created. The "defined-hierarchy" list may be populated with pre-defined and user-defined hierarchies. The "hierarchies" list may be populated with the grouping information extracted from the BI artifact and/or semantic layer objects. For example, some or all the dimensions, measures, filters, prompts and LOVs found in the BI artifacts and/or semantic layer objects may be extracted and indexed.

A "defined-hierarchy-value" list may be validated and dynamically built to store hierarchy values extracted from the "defined-hierarchy" list. In one implementation, each hierarchy in the "defined-hierarchy" list is tokenized to extract the dimension or group name. If the hierarchy token matches a valid existing dimension name, the dimension value is extracted and added to the "defined-hierarchy-value" list. The hierarchy structure may be built in the format: "gpN[gpV]/pN[pV]/facetName[facetValue]", as described previously. Non-validated hierarchy tokens may be skipped. The full hierarchy name-value path of validated hierarchy token may be added to the "hierarchies" list. The facet hierarchy document may then be populated with the hierarchy name-value paths in the "hierarchies" list.

In one implementation, the contents of the facet hierarchy documents are merged to generate one or more index documents. An exemplary index document is a hierarchy index document, which stores the mapping between facet parents and their respective children extracted from the facet hierarchy documents. The hierarchy index document is a temporary document that may be added to the master index 510.

FIG. 9 shows an exemplary hierarchy index document 902. As shown, for every link in the hierarchy 904, a child facet identifier (ID) 906 is mapped to a parent facet ID 908. For example, it can be inferred that facet IDs {4, 5, 6} are the parents of child facet id {1}. The hierarchy index document 902 groups all the parent IDs (908) for a particular child ID (906) and stores the information in sequence to facilitate faster writing to facet value parent mapping files. It may be generated towards the end of content store generation phase when each facet has been assigned a corresponding unique ID.

Referring back to FIG. 7, at 706, the facets are dynamically linked using the extracted grouping information to generate dynamic hierarchical facets. In one implementation, such dynamic linking is performed during content store generation. Facets that are identified as one or more sub-parts of a hierarchy extracted during the previous step 704 may be dynamically linked to build the hierarchy path. For example, if a facet hierarchy of the following structure has been identified:

fhi__1[value1]/fhi__1.1[value1.1]/fhi__1.1.1
[value1.1.1] . . . Fhi__1.1..n[value__1.1..n], wherein a facet found in a BI artifact of the format "fhi__1.1/value1.1" may be dynamically linked to this facet hierarchy at run-time. This facilitates the identification and building of hierarchies based on facets found in other hierarchies. Accordingly, a previously identified hierarchy may be leveraged to dynamically link facets in other BI artifacts.

In one implementation, the dynamic facet hierarchy generation step 706 is implemented in two exemplary phases. FIGS. 10*a-b* show the exemplary pseudo-code (1002 and 1004) for implementing the first and second phases respectively during content store generation. It should be recognized, however, that the scope of the present disclosure is not limited to this implementation. For example, fewer or additional phases may be implemented to perform this step 706. In addition, indexing technology other than Lucene, such as TREX, may also be used.

During the first phase, as illustrated by the pseudo code 1002 in FIG. 10*a*, the facet hierarchy documents are retrieved. The existing facet hierarchy documents may be processed before other types of documents are processed. In one implementation, the facet hierarchy documents are processed by reading the facet hierarchy field values from each document. For each facet hierarchy field value in the facet hierarchy documents, each category may be unpacked into the parent and child categories. The information of the parent and child categories is used to update the category master and category index files.

Figure 11:
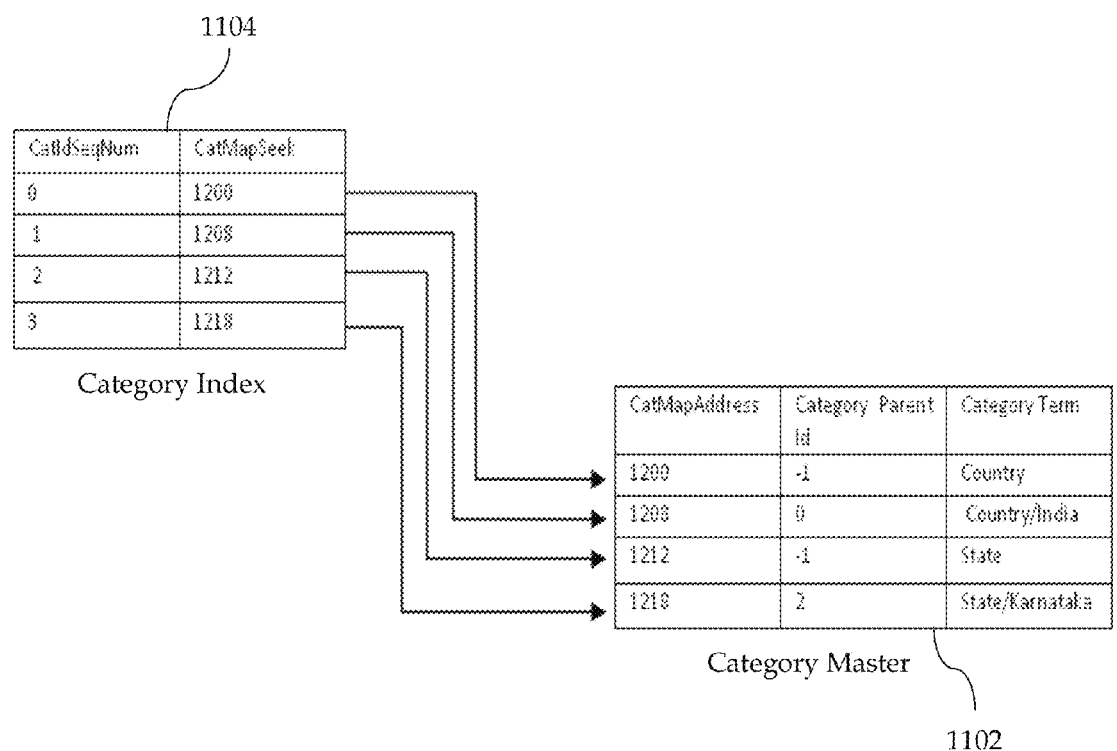
FIG. 11 shows exemplary category master and category index files.

FIG. 11 shows an exemplary category master file 1102 and category index file 1104. As previously described with reference to FIGS. 6*a-b*, the category index file 1104 stores the starting address (CatMapSeek) of each record in the category master file 1102. These category master and category index files may be added to the content store 514. In one implementation, each record in the category master file 1102 stores information for a unique category (Category Term) in <fp/fv> format, the corresponding Category Parent Id and unique mapping addresses (CatMapAddress). The category index file 1104 stores the mapping between the starting address (CatMapSeek) and a unique category identifier (CatIdSeqNum) that may be generated for each unique category in the category master file 1102 during the first phase of the dynamic facet hierarchy generation step 706. The unique CatIdSeqNum may be, for example, a sequence number starting from 0.

During the second phase of the dynamic facet hierarchy generation step 706, as illustrated by the pseudo code 1004 in FIG. 10*b*, the categories (or facets) stored in the category master and category index files are dynamically linked using information retrieved from the hierarchy index document to map child categories (or facets) to corresponding one or more parent categories (or facets). As discussed previously, the hierarchy index document is a temporary document that is generated during the indexing phase to store the mapping between facet parents and their respective children.

Figure 12:
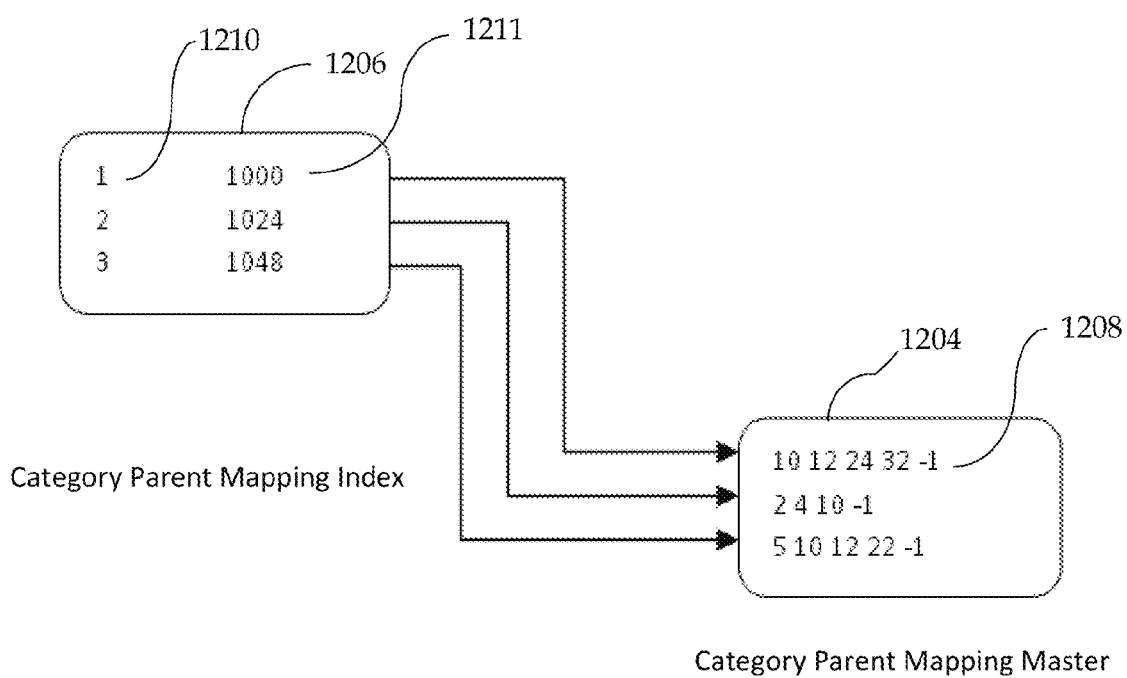
FIG. 12 illustrates exemplary category parent mapping master and index files.

The mappings of child categories to their corresponding parent categories may be stored in mapping files category parent mapping master and category parent mapping index files. FIG. 12 illustrates an exemplary category parent mapping master file 1204 and an exemplary category parent mapping index file 1206. As previously described with reference to FIG. 6*b*, the category parent mapping index file 1206 stores the mappings between the child category ID 1210 and the starting address 1211 of the corresponding record in the category parent mapping master 1204. Each record in the category parent mapping master file 1204 stores a list of parent IDs 1208 for a unique child category in the category parent mapping index. The parent list 1208 may be terminated by a predetermined value (e.g., −1).

At 708, the search module 508 performs a search and incorporates the dynamically built hierarchical facets in the search results. In one implementation, when the user initiates a search query, the search module 508 receives a search request object (e.g., HttpRequest object) from the client system 440. This search request object may be a container of the raw search query, page size, client locale, user profile information, any category information for filtering the search results, etc. A search request data object may be created and populated with the information in the search request object. The search request data object may then be passed via, for example, a getResponse call, to a backend search agent. The backend search agent may be tied to a search or indexing technology (e.g., Lucene, TREX, etc.), and its implementation may vary according to the client's business needs. The search agent serves to process the search request data object, retrieve search results from an indexing technology and build an appropriate data format to send the search results back to the client system 440.

In one implementation, category information is retrieved using the category IDs found in the search results. Such category information may be retrieved from, for example, the category master file by looking up the category index file using the category identifiers found in the search results. For each category identifier found, the corresponding parent IDs may be recursively retrieved from the category parent mapping master file by looking up the category parent mapping index file. The number of parent categories for each category hit, as well as the number of document hits for each category, may also be determined.

The category information, including the dynamically linked hierarchical facet information, may then be incorporated in the search results. In one implementation, the facets and the search results are combined in a client-friendly data format. Once the formatted search results are generated, they may be used to update the search response object (e.g., XML object) to send back to the client system 440. The search response object serves to store, for example, the search results, including the actual search hit information (e.g., search reports), and hierarchical facets specific to the search query for filtering the search results.

At 710, the hierarchical facets are ranked (or weighted) based on relevancy information. The ranking may be static and/or dynamic, depending on the type of relevancy information used to generate the weights. Static ranking is performed based on current relevancy information that is extracted from search results of the current search query. Dynamic ranking is performed based on prior relevancy information collected from prior search queries, such as the search usage history and user profile. Search usage history may include, for example, prior user events on facets returned during searches. Such dynamic ranking enhances the ease of navigation by filtering the search results using facets (e.g., normal, hierarchical or meta facets) that are most relevant to the current user based on the user's usage history, profile or any other criteria. If such dynamic relevancy information is not available, static ranking may be performed without dynamic ranking.

Figure 13A:
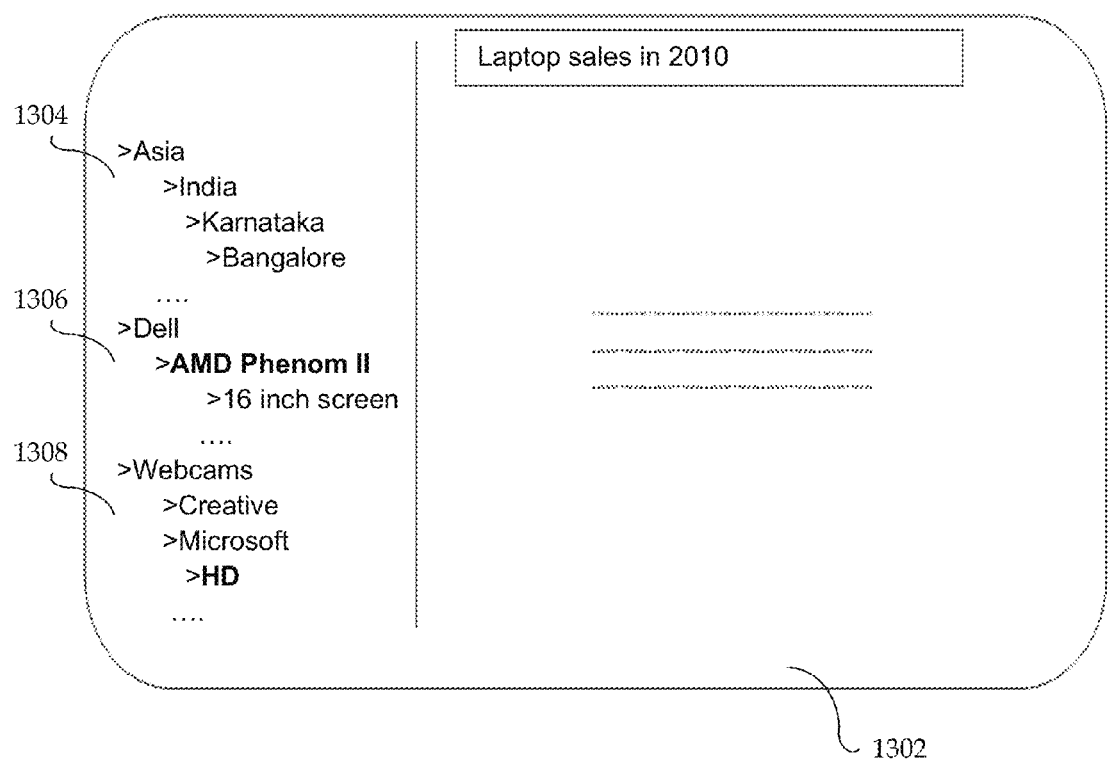
FIGS. 13a-b illustrate an exemplary use case.
Figure 13B:
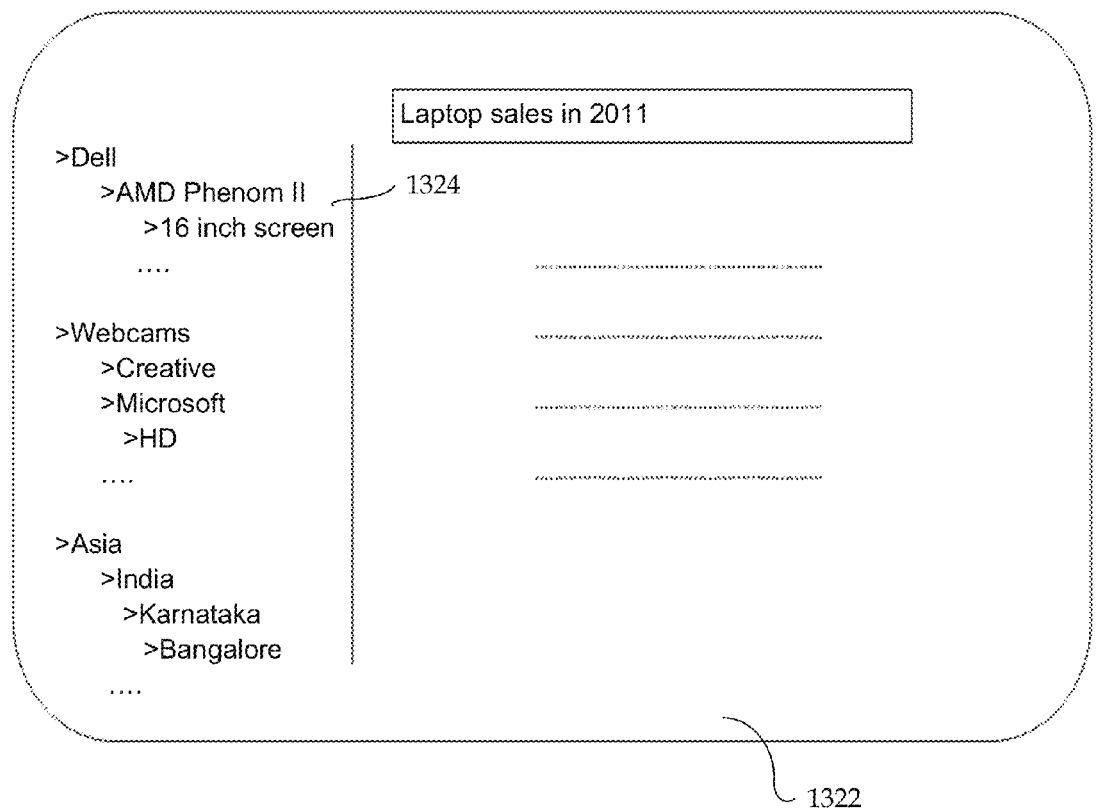

FIGS. 13*a-b* illustrate an exemplary use case. More particularly, FIG. 13*a* shows a display 1302 illustrating a first iteration of a user query for "laptop sales in 2010," while FIG. 13*b* shows a display 1322 illustrating subsequent iterations of user queries for "laptop sales in 2011." Referring to FIG. 13a, the hierarchical facets generated in response to the user query are: 'Continent/Country/State/City' (1304), 'Brand/Processor/Screen Size' (1306) and 'Accessories/Brand/Sensor' (1308). The user narrows down the search to 'AMD Phenom II' in the second hierarchical facet and 'HD' in the third hierarchical facet to filter search results.

From the usage history of this particular user, it may be discovered that the current user frequently narrows down the search to 'Processor' and 'Sensor' for 'laptop sales in xxxx' type of search queries. Such usage history may be used to dynamically rank the facets in subsequent iterations of similar queries. For example, in FIG. 13b, when a subsequent user query is performed, the hierarchical facets 'Brand/Processor/Screen Size' and 'Accessories/Brand/Sensor' are ranked higher than 'Continent/Country/State/City' based on the particular user's usage history. The facets may also be ranked based on the user profile. For example, if the profile of the current user fits the profile of a group of users who frequently select the facets 'Processor' and 'Sensor,' the hierarchical facets 'Brand/Processor/Screen Size' may be ranked higher than other facets.

To achieve such facet ranking, a learning phase may be performed each time after search results are displayed to the user. In accordance with one implementation, the learning phase is initiated by the search module 508 retrieving from the client system 440 the search response object that was generated in response to the search query. As discussed previously, the search response object may include search results combined with the hierarchical facet information. The search module 508 may further retrieve, from the client system 440, logs of user events on the facets (e.g., user selections of hierarchical facets), user name or profile information, search query information, etc.

Figure 14A:
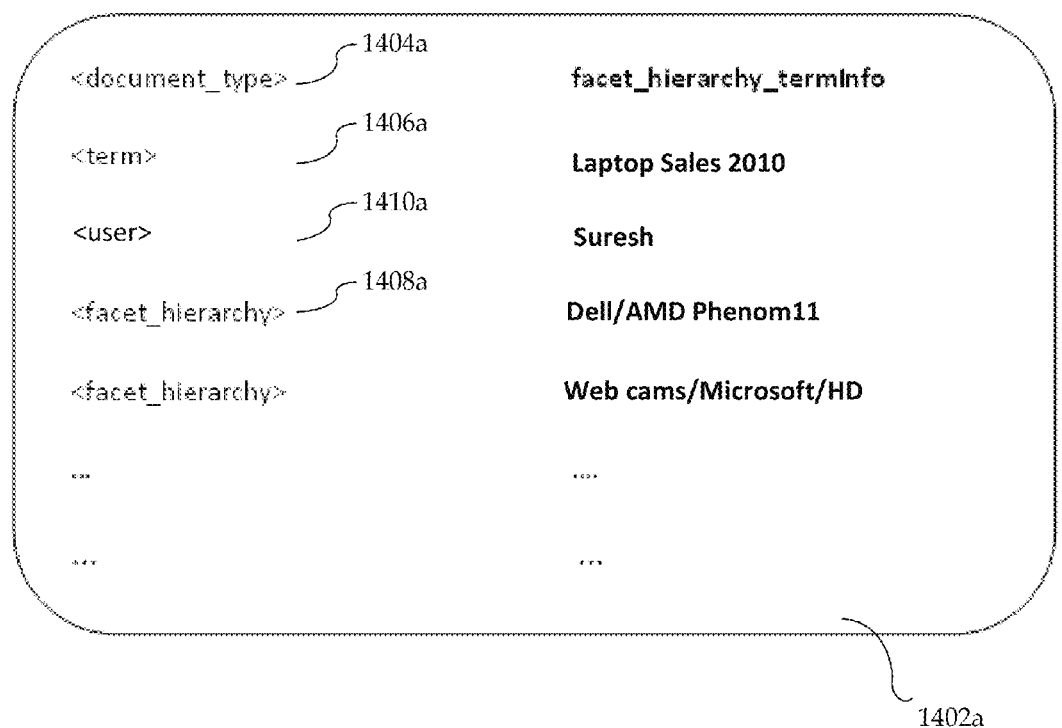
FIGS. 14a-b show exemplary facet hierarchy term information files.
Figure 14B:
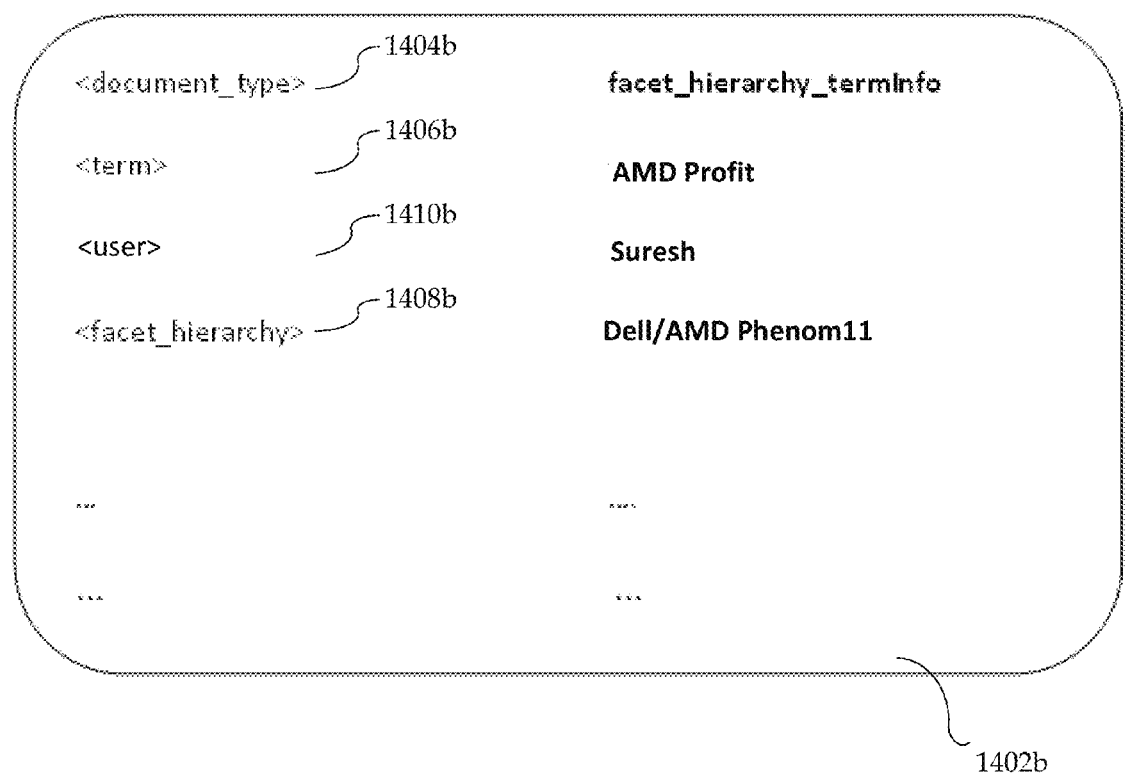

In one implementation, the search module 508 creates or updates a Facet_Hierarchy_Index file 512 and corresponding facet hierarchy term information files for a given user. The Facet_Hierarchy_Index file 512 stores the starting address and search term information of each facet hierarchy term information file. FIGS. 14a-b show exemplary facet hierarchy term information files (1402a-b). As shown, the facet hierarchy term information file (1402a-b) stores the document information (e.g., type) (1404a-b), the search term (1406a-b) and the hierarchical facets (1408a-b) previously selected by the particular user. Additional information, such as the user name or profile (1410a-b), may also be stored.

When a new user event log is retrieved, the search module 508 may search the Facet_Hierarchy_Index file 512 to determine if each search term in the search query corresponding to the new user event log has been previously processed. If the search term has not been previously processed (i.e., there is no usage history), a new facet hierarchy term information file (1402a-b) is generated for the search term and the Facet_Hierarchy_Index file 512 may be updated. If the search term has already been previously processed, the respective facet hierarchy term information file (1402a-b) is updated with the hierarchical facets obtained from the user event logs.

In subsequent search iterations, before the search results are displayed to the user, the static and/or dynamic relevancy information (e.g., results of the learning phase) may be used to rank the hierarchical facets for presentation to the user. When the user initiates a search query at the client system 440, a search request object may be sent to the search module 508. In response, the search module 508 returns a search response object containing the search results. For a given search term, all the facets contained in the matching BI artifacts in the search results may be retrieved and stored in a data structure "ROOT_SET." To determine those facets contained in the matching BI artifacts, the search module 508 may look up the file ObjectToCategoryMapping in the Content Store 514. For example, referring to FIG. 6a, it can be determined that Category ID=5 is contained in two BI artifacts, while Category ID=0 is contained in one BI artifact. The ROOT_SET_COUNT represents the number of matching BI artifacts for a given facet. It may be used as the "static score," which is applied as the ranking score when no dynamic relevancy information is available. This may be the case when the user has no prior usage history, and therefore no corresponding Facet_Hierarchy_Index file 512 (or facet hierarchy term information files) is available.

If dynamic relevancy information is available (e.g., a corresponding Facet_Hierarchy_Index file 512 exists), the search module 508 searches for all the facets that the particular user has previously accessed and that contain at least one term of the current search query. This may be achieved by, for example, looking up the user's Facet_Hierarchy_Index file 512, and retrieving facet hierarchical term information files that contain any of the terms in the current search query. From the matching hierarchical term information files, all the hierarchical facets may be extracted and stored in a temporary data structure TERM_SET. The number of facets in the TERM_SET data structure may be determined and stored as an integer value "TERM SET_COUNT."

Similarly, the search module 508 may find all the facets which the particular user has previously accessed and that do not contain any term of the current search query. This may be achieved by, for example, looking up the user's Facet_Hierarchy_Index file 512, and retrieving facet hierarchical term information files that do not contain any of the terms in the current search query. From the matching hierarchical term information files, all the hierarchical facets may be extracted and stored in a temporary data structure PROFILE_SET. The number of facets in the PROFILE_SET data structure may be determined and stored as an integer value "PROFILE_SET_COUNT."

In some embodiments, the ranking score (SCORE) for each hierarchical facet in the search response object may be computed as follows:

$$\begin{aligned} \text{SCORE} &= \text{Static Score} + \text{Dynamic Score} \\ &= \text{ROOT\_SET\_COUNT} + \\ &\quad ((\text{TERM\_SET\_COUNT} * \text{Term\_Weight}) + \\ &\quad (\text{PROFILE\_SET\_COUNT} * \text{Profile\_Weight})) \end{aligned} \quad (1)$$

where Term_Weight and Profile_Weight refer to configurable weights for scoring a particular hierarchical facet. Such weights may be, for example, integer values that are predefined by the administrator. For instance, if user profile is deemed to be more important than usage history, then Profile_Weight may be set to a higher value than Term_Weight (e.g., 100 and 10 respectively). It should be noted that other methods of computing SCORE may also be implemented. For example, SCORE may be assigned the value of either the Static Score or the Dynamic Score, not both. After the ranking SCORE is computed for each hierarchical facet in the search response object, the hierarchical facets may be sorted in descending order of their respective ranking scores. The search results, along with the sorted hierarchical facets, may then be presented to the user.

To further illustrate ranking in accordance with one implementation, reference may be made to the exemplary use case shown in FIGS. 13a-b and corresponding facet hierarchy term information files (1402a-b) shown in FIGS. 14a-b. Referring to FIG. 13a, a user "Suresh" may start afresh (i.e. no prior usage history) with a new search query for the search term "Laptop Sales 2010." The search module 508 retrieves BI artifacts (e.g., documents, reports, etc.) that match the search term. Suresh then selects the categories Dell→AMD Phenom, and Web cams→Microsoft→HD. Since the search term has not been previously processed, a new facet hierarchy term information file 1402a is generated, as shown in FIG. 14a. FIG. 14b shows another facet hierarchy term information file 1402b generated when Suresh next searches for "AMD Profit."

In a subsequent search iteration n, Suresh searches for "Laptop sales 2011." As shown in FIG. 13b, the display 1322 presents the list of facets 1324. Prior to displaying the list of facets 1324, the search module 508 may rank the list of facets 1324 statically and/or dynamically, as described previously. The static ranking score of a facet may be determined by determining the number of matching documents that contain the facet in the search results. For example, the facet "AMD Phenom" may be found in 4 matching documents (or BI artifacts), and is therefore assigned a static score of 4. The "HD" facet may be contained in 5 matching documents (or BI artifacts) and accordingly assigned a static score of 5. Similarly, the hierarchical facet Asia/India/Karnataka/Bangalore and accordingly may be assigned a static score of 9.

The ranking score (SCORE) for the facet "AMD Phenom" may be computed as follows:

$$\begin{aligned} \text{SCORE} &= \text{Static Score} + \text{Dynamic Score} \\ &= \text{ROOT\_SET\_COUNT} + \\ &\quad ((\text{TERM\_SET\_COUNT} * \text{Term\_Weight}) + \\ &\quad (\text{PROFILE\_SET\_COUNT} * \text{Profile\_Weight})) \\ &= 4 + ((2*100) + (0*10)) \\ &= 204; \end{aligned} \qquad (2)$$

wherein
ROOT_SET_COUNT=4;
TERM_SET_COUNT=2, since it may be determined from the facet hierarchy term information files 1402a-b that Suresh has accessed "AMD Phenom" 2 times;
PROFILE_SET_COUNT=0, since "user=Suresh and terms !=Laptop Sales 2011" has zero matches;
Term_Weight=100; and
Profile_Weight=10.

Similarly, the ranking SCORE for the other facets "HD" and "Asia/India/Karnataka/Bangalore" may be computed. Since the ranking SCORE for "AMD Phenom" is the highest, the hierarchical facet "Dell/AMD Phenom II" is displayed at the top of the facet list 1324, followed by "Webcams/HD", followed by "Asia/India/Karnataka/Bangalore," as shown in FIG. 13b.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A method implemented by a processor, comprising:
   extracting, by the processor, grouping information from a semantic layer associated with one or more business intelligence artifacts, wherein the grouping information includes hierarchical information, dimensions, measures, filters, prompts, a list of values, or a combination thereof;
   inferring at least one dynamic hierarchy that has not been previously defined by at least merging the grouping information stored in multiple documents to generate an index document;
   prior to performing a search, dynamically linking, by the processor, facets based at least in part on the index document to generate one or more hierarchical facets, wherein the facets are categories generated from the one or more business intelligence artifacts, wherein dynamically linking the facets comprises adding one or more mapping files to a content store for storing mappings of multiple child facets to one or more corresponding parent facets;
   performing, by the processor, the search to generate results of the search;
   incorporating, by the processor, the one or more hierarchical facets in the results of the search to facilitate navigation by combining the results of the search and the one or more hierarchical facets in a data format; and
   presenting, via an output device, the results of the search and the one or more incorporated hierarchical facets.

2. The method of claim 1 further comprising identifying the one or more business intelligence artifacts by searching a data repository for new or modified business artifacts.

3. The method of claim 1 wherein the grouping information comprises one or more pre-defined or user-defined hierarchies.

4. The method of claim 1 further comprising:
   storing one or more hierarchies from the grouping information in one or more intermediate documents; and
   merging content in the one or more intermediate documents to generate one or more index documents to store mappings between parent facets and child facets.

5. The method of claim 1 wherein dynamically linking the facets comprises:
   identifying at least one of the facets as a sub-part of a hierarchy from the grouping information; and
   dynamically linking the facet to the hierarchy.

6. The method of claim 1 wherein dynamically linking the facets comprises mapping a child facet to the one or more corresponding parent facets.

7. The method of claim 1 wherein the grouping information is extracted from metadata of the one or more business intelligence artifacts or the semantic layer.

8. The method of claim 1 wherein the one or more mapping files comprise an index file and a master file, wherein the index file stores a mapping between a child facet identifier and a starting address of a record in the master file, wherein the record in the master file stores a list of one or more corresponding parent facet identifiers.

9. The method of claim 8 wherein incorporating the one or more hierarchical facets in the search results comprises:
   performing the search in response to a search request; and
   retrieving, from the master file, the one or more parent facet identifiers corresponding to the child identifier.

10. The method of claim 1 wherein incorporating the one or more hierarchical facets in the search results comprises:
   performing the search in response to a search request; and
   retrieving the one or more dynamically linked parent facets corresponding to a child category.

11. The method of claim 1 further comprising ranking the one or more hierarchical facets based on relevancy information.

12. The method of claim 11 wherein the ranking comprises statically ranking the one or more hierarchical facets based on current relevancy information.

13. The method of claim 11 wherein the ranking comprises dynamically ranking the one or more hierarchical facets based on prior relevancy information.

14. The method of claim 13 wherein the prior relevancy information comprises a user's search usage history or profile.

15. The method of claim 13 wherein the dynamically ranking the one or more hierarchical facets comprises creating or updating a facet hierarchy term information file that stores a search term and one or more hierarchical facets previously selected by a user.

16. The method of claim 13 wherein the dynamically ranking the one or more hierarchical facets comprises:
   receiving a search request including a search term or user profile;
   retrieving one or more facet hierarchy term information files based on the search term or user profile;
   determining a number of matches of each hierarchical facet in a search response with hierarchical facets in the one or more facet hierarchy term information files; and
   computing a ranking score for each hierarchical facet in the search response based on the number of matches.

17. A non-transitory computer-readable medium having stored thereon program code, the program code is executable by a computer to:
   extract grouping information from a semantic layer associated with one or more business intelligence artifacts, wherein the grouping information includes hierarchical information, dimensions, measures, filters, prompts, a list of values, or a combination thereof;
   infer at least one dynamic hierarchy that has not been previously defined by at least merging the grouping information stored in multiple documents to generate an index document;
   prior to performing a search, dynamically link facets based at least in part on the index document to generate one or more hierarchical facets, including adding one or more mapping files to a content store for storing mappings of multiple child facets to one or more corresponding parent facets, wherein the facets are categories generated from the one or more business intelligence artifacts;
   perform the search to generate results of the search;
   incorporate the one or more hierarchical facets in the results of the search to facilitate navigation by combining the results of the search and the one or more hierarchical facets in a data format; and
   present the results of the search and the one or more incorporated hierarchical facets.

18. The non-transitory computer-readable medium of claim 17 wherein the program code is further executable by the computer to rank the one or more hierarchical facets based on relevancy information.

19. A system comprising:
   a memory device for storing non-transitory computer readable program code; and
   a processor in communication with the memory device, the processor being operative with the computer readable program code to:
      extract grouping information from one or more business intelligence artifacts or a semantic layer, wherein the grouping information includes hierarchical information, dimensions, measures, filters, prompts, a list of values, or a combination thereof;
      infer at least one dynamic hierarchy that has not been previously defined by at least merging the grouping information stored in multiple documents to generate an index document;
      prior to performing a search, dynamically link facets based at least in part on the index document to generate one or more hierarchical facets, including adding one or more mapping files to a content store for storing mappings of multiple child facets to one or more corresponding parent facets, wherein the facets are categories generated from the one or more business intelligence artifacts;
      perform the search to generate results of the search;
      incorporate the one or more hierarchical facets in the results of the search to facilitate navigation by combining the results of the search and the one or more hierarchical facets in a data format; and
      present the results of the search and the one or more incorporated hierarchical facets.

* * * * *